United States Patent
Nygaard et al.

(10) Patent No.: US 8,010,987 B2
(45) Date of Patent: Aug. 30, 2011

(54) SYSTEM FOR TRANSMITTING INFORMATION FROM A STREAMED PROGRAM TO EXTERNAL DEVICES AND MEDIA

(75) Inventors: Kristian Knak Nygaard, Frederiksberg (DK); Soren Thomsen, Copenhagen (DK); Soren Skov, Copenhagen (DK); Peter Praest, Copenhagen (DK); Ezra Darshan, Beit Shemesh (IL)

(73) Assignee: NDS Limited, Staines, Middlesex (GB)

( * ) Notice: Subject to any disclaimer, the term of this patent is extended or adjusted under 35 U.S.C. 154(b) by 486 days.

(21) Appl. No.: 10/556,936

(22) PCT Filed: Jun. 1, 2004

(86) PCT No.: PCT/IL2004/000466
§ 371 (c)(1),
(2), (4) Date: Jul. 19, 2006

(87) PCT Pub. No.: WO2004/110074
PCT Pub. Date: Dec. 16, 2004

(65) Prior Publication Data
US 2007/0094703 A1    Apr. 26, 2007

Related U.S. Application Data

(60) Provisional application No. 60/476,136, filed on Jun. 5, 2003, provisional application No. 60/551,714, filed on Mar. 10, 2004.

(51) Int. Cl.
*H04N 7/173* (2011.01)
(52) U.S. Cl. ......... 725/105; 725/109; 725/115; 725/116
(58) Field of Classification Search .................. 725/139, 725/141
See application file for complete search history.

(56) References Cited

U.S. PATENT DOCUMENTS

| | | | |
|---|---|---|---|
| 5,602,582 A * | 2/1997 | Wanderscheid et al. | 725/139 |
| 5,606,365 A | 2/1997 | Maurinus et al. | |
| 5,903,816 A | 5/1999 | Broadwin et al. | |
| 5,929,850 A | 7/1999 | Broadwin et al. | |
| 6,018,768 A * | 1/2000 | Ullman et al. | 709/218 |
| 6,139,197 A | 10/2000 | Banks | |

(Continued)

FOREIGN PATENT DOCUMENTS

EP    1 333 670    1/2003

(Continued)

OTHER PUBLICATIONS

Mackay, W.E., et al. "Virtual Video Editing in Interactive Multimedia Applications." *Communications of the ACM.*. vol. 32, No. 7 (1989) pp. 802-810.

(Continued)

*Primary Examiner* — Brian T Pendleton
*Assistant Examiner* — Ryan Stronczer
(74) *Attorney, Agent, or Firm* — Husch Blackwell LLP

(57) ABSTRACT

A method for selecting a section from a streamed broadcast program is disclosed. The method includes receiving a streamed broadcast program, rendering the received streamed broadcast program on a display, selecting a section from the received streamed broadcast program substantially when the section is rendered on the display, and producing an indication signal which enables identification of the section based on a time at which selection of the section was carried out with respect to rendering progress of the streamed broadcast program on the display. Related apparatus and methods are also disclosed.

49 Claims, 16 Drawing Sheets

U.S. PATENT DOCUMENTS

| | | | |
|---|---|---|---|
| 6,172,672 | B1 | 1/2001 | Ramasubramanian et al. |
| 6,496,980 | B1 | 12/2002 | Tillman et al. |
| 6,496,981 | B1 | 12/2002 | Wistendahl et al. |
| 2003/0011636 | A1 | 1/2003 | Feroglia et al. |
| 2003/0038893 | A1* | 2/2003 | Rajamaki et al. ............. 348/553 |
| 2003/0066080 | A1* | 4/2003 | Kamieniecki ................... 725/80 |
| 2003/0093786 | A1 | 5/2003 | Amsellem |
| 2003/0110506 | A1* | 6/2003 | Kim ................................ 725/95 |
| 2003/0167469 | A1 | 9/2003 | Hardingham et al. |
| 2003/0229900 | A1* | 12/2003 | Reisman .......................... 725/87 |
| 2004/0003394 | A1* | 1/2004 | Ramaswamy ................... 725/28 |
| 2004/0117269 | A1 | 6/2004 | Karaoguz et al. |
| 2004/0117852 | A1 | 6/2004 | Karaoguz et al. |
| 2004/0139474 | A1* | 7/2004 | Carro ............................ 725/112 |
| 2005/0005308 | A1* | 1/2005 | Logan et al. ................... 725/135 |
| 2005/0022229 | A1* | 1/2005 | Gabriel et al. ................... 725/28 |
| 2005/0210526 | A1* | 9/2005 | Levy et al. .................... 725/113 |
| 2005/0280743 | A1* | 12/2005 | Dresti et al. ................... 348/734 |

FOREIGN PATENT DOCUMENTS

| | | |
|---|---|---|
| EP | 1 359 710 | 3/2003 |
| EP | 1 304 876 | 4/2003 |
| EP | 1 372 333 | 6/2003 |
| WO | 99/21364 | 4/1999 |
| WO | 99/59339 | 11/1999 |
| WO | 01/35669 | 5/2001 |
| WO | WO 02/33976 A1 | 4/2002 |
| WO | 02/082796 | 10/2002 |
| WO | 02/091739 | 11/2002 |
| WO | 03/010970 | 2/2003 |
| WO | 03/041393 | 5/2003 |
| WO | 03/055217 | 7/2003 |

OTHER PUBLICATIONS

Evain, J.P. "The Multimedia Home Platform—an overview." *EBU Technical Review* (1998) pp. 1-12.

"NTP:The Network Time Protocol" publication (Updated 2003) available on the world wide web at www.ntp.org.

Online "DAVIC 1.4.1 Specification Part 9:1999" Digital Audio-Visual Council (1999) p. 1-330, XP-002389611, Geneva, Switzerland, Retrieved from the Internet. http://portal.etsi.org/docbox/Reference/DAVIC/DAVIC%201.4.1%20Specification%20part%209.pdf.

Jul. 27, 2010 Office Communication in connection with prosecution of EP 04 735 646.4.

* cited by examiner

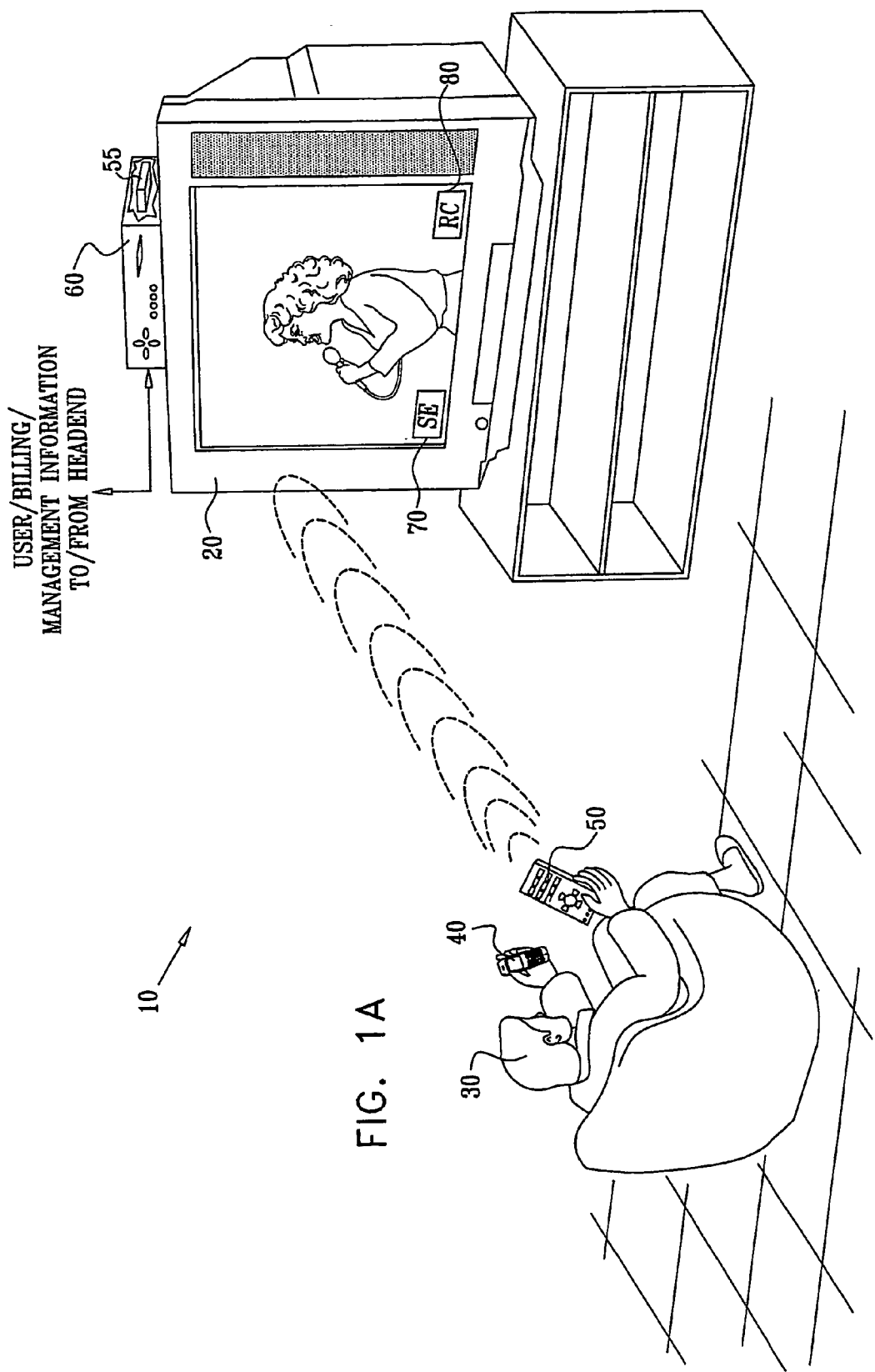

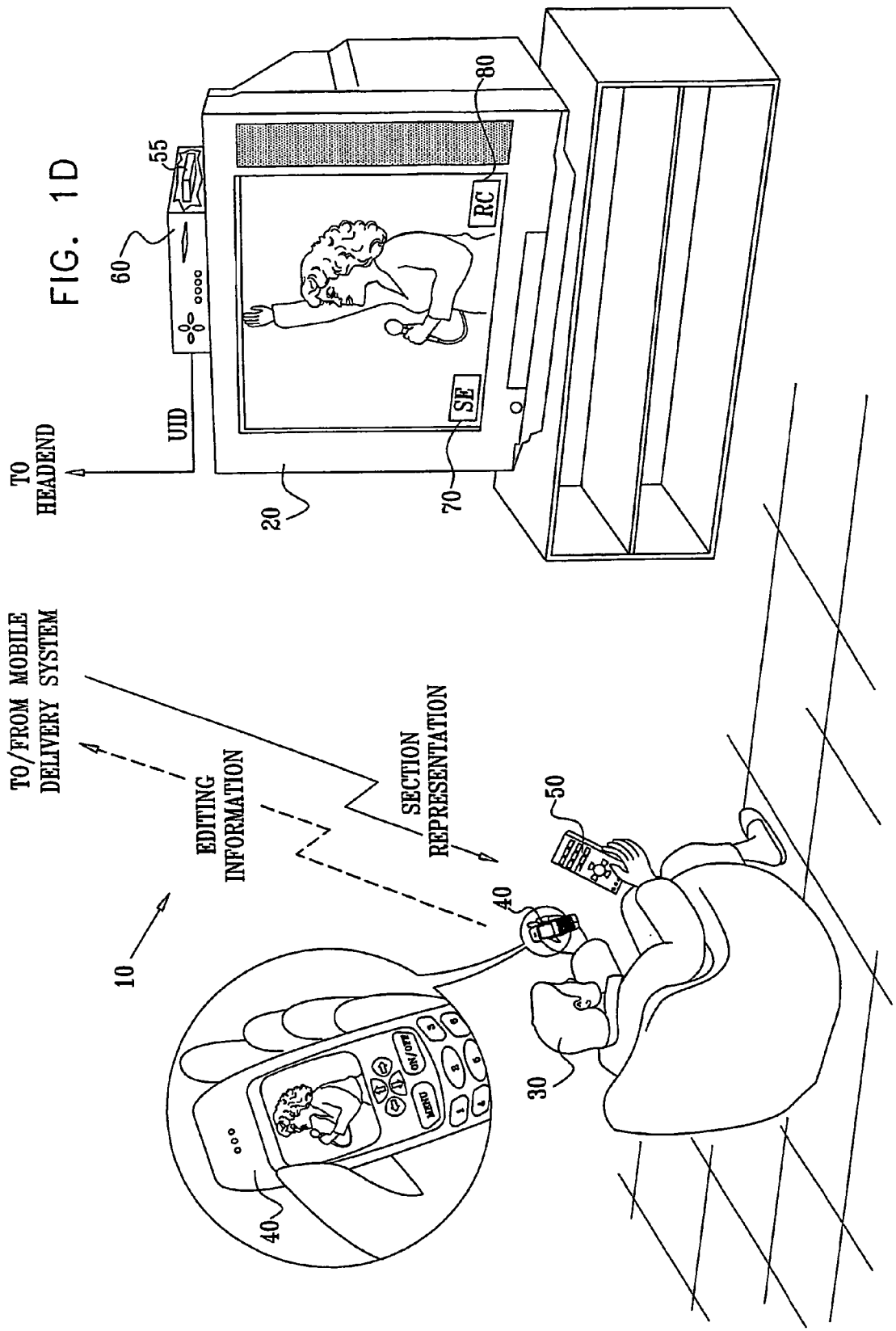

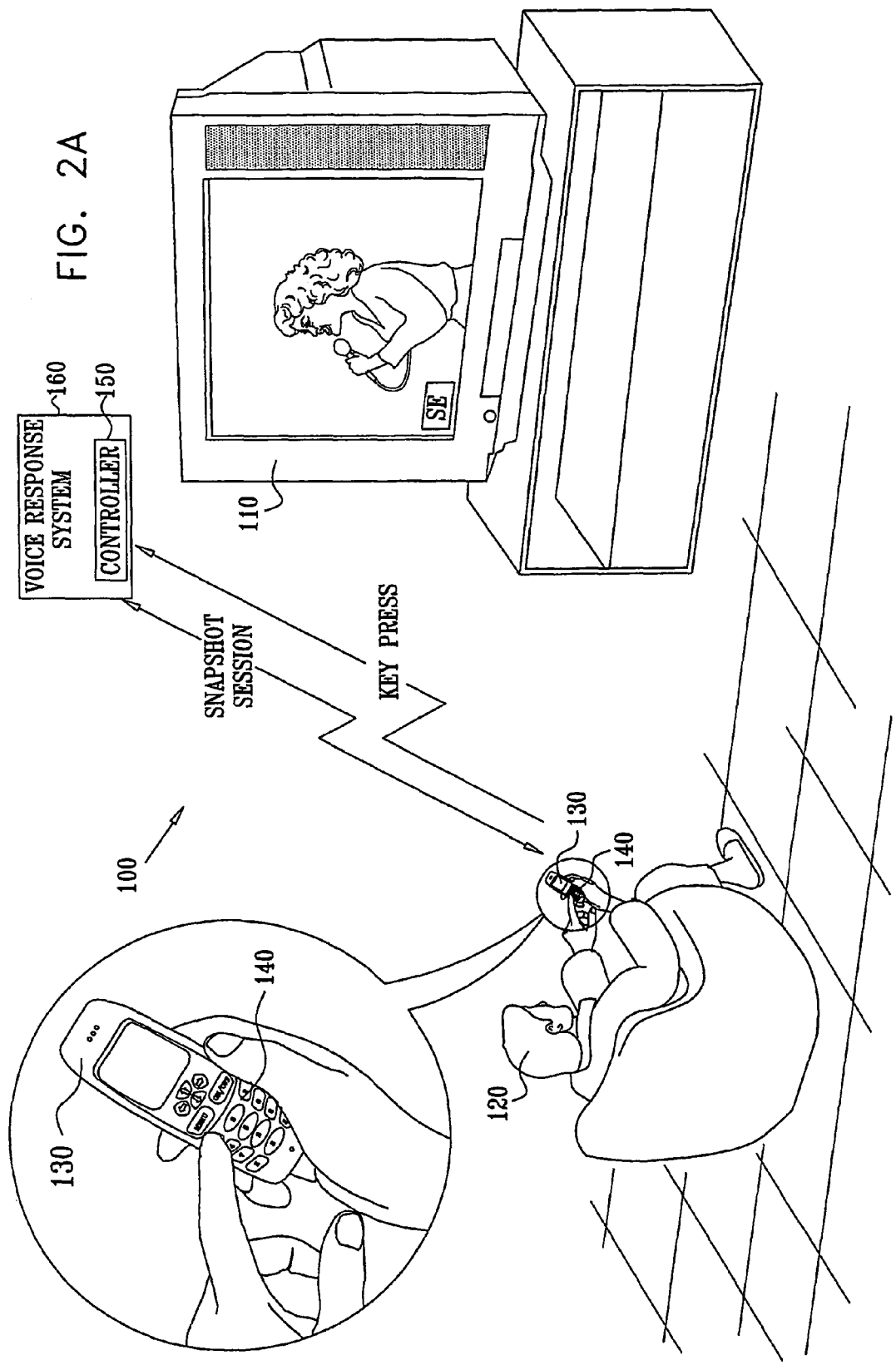

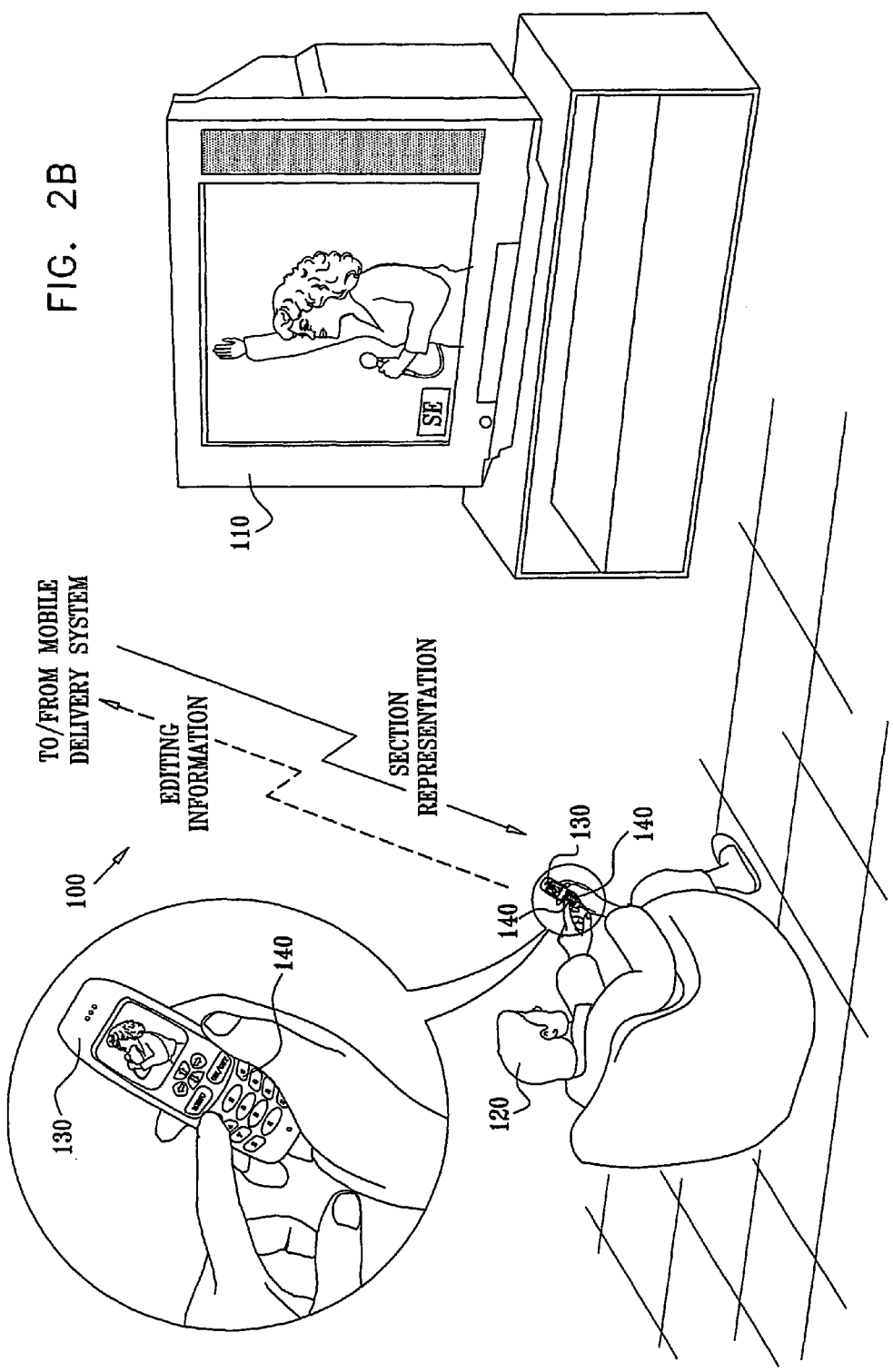

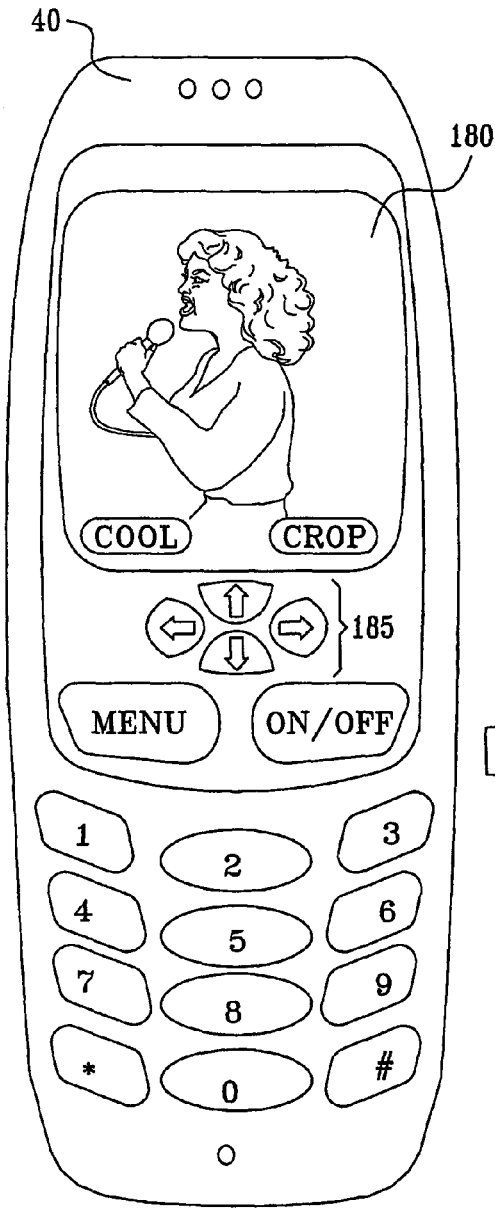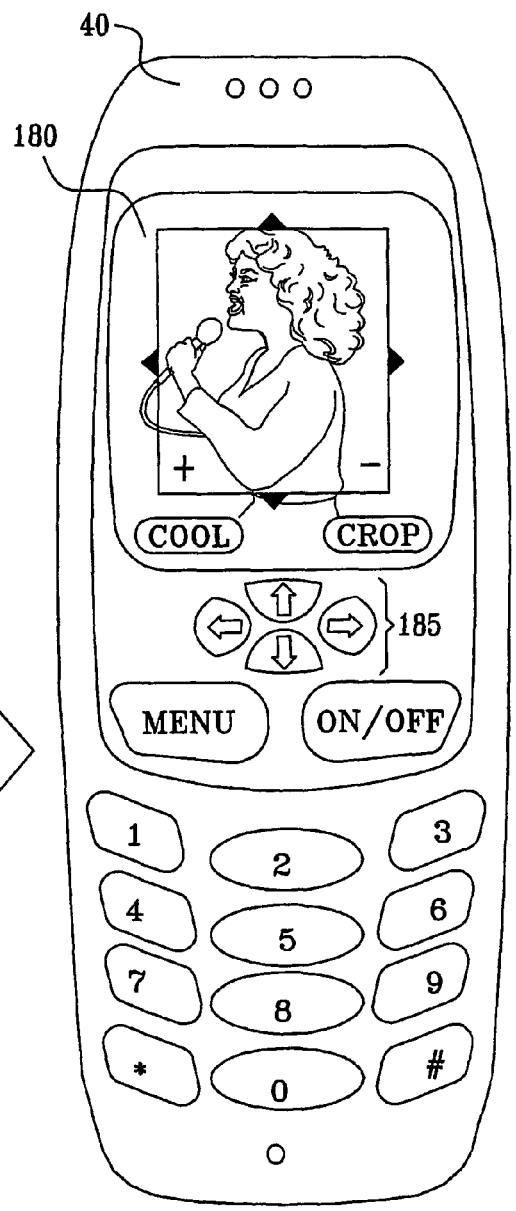

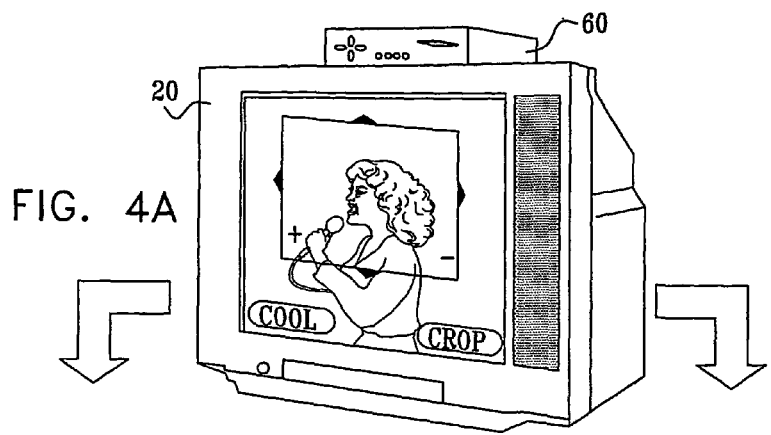
FIG. 4A
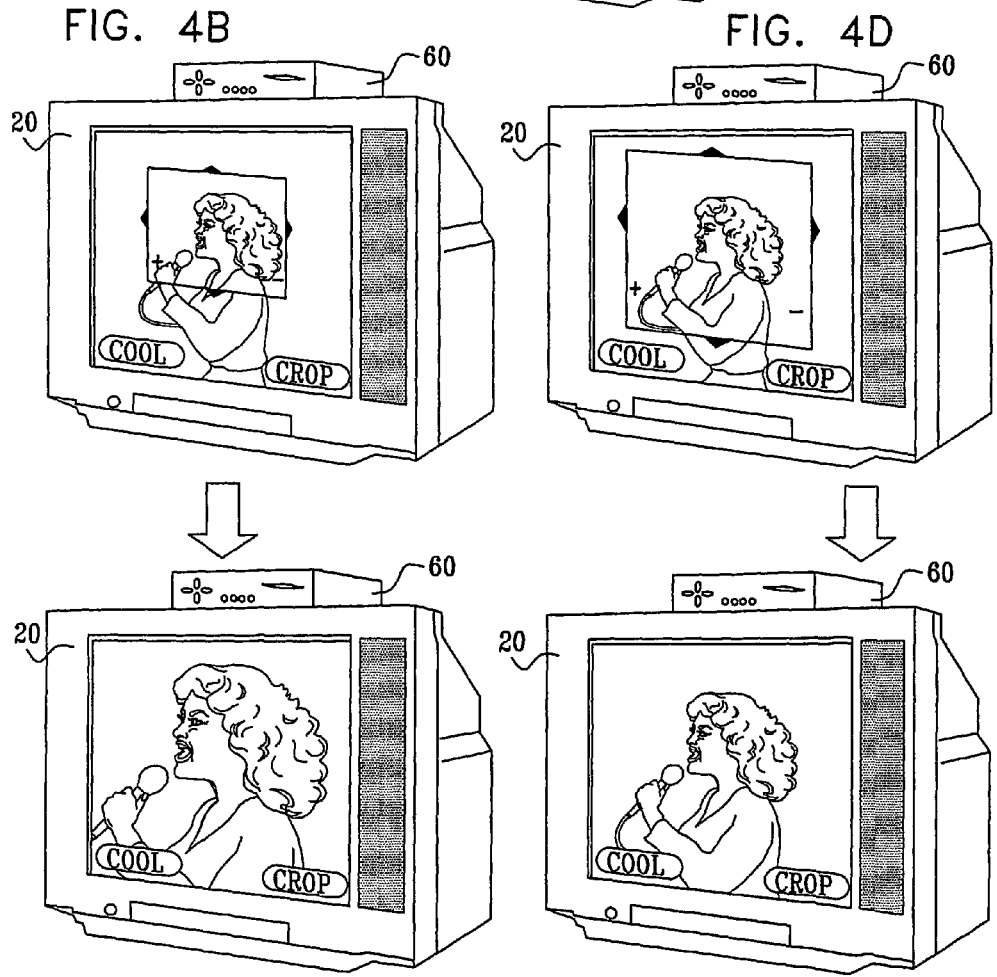
FIG. 4B  FIG. 4D
FIG. 4C  FIG. 4E

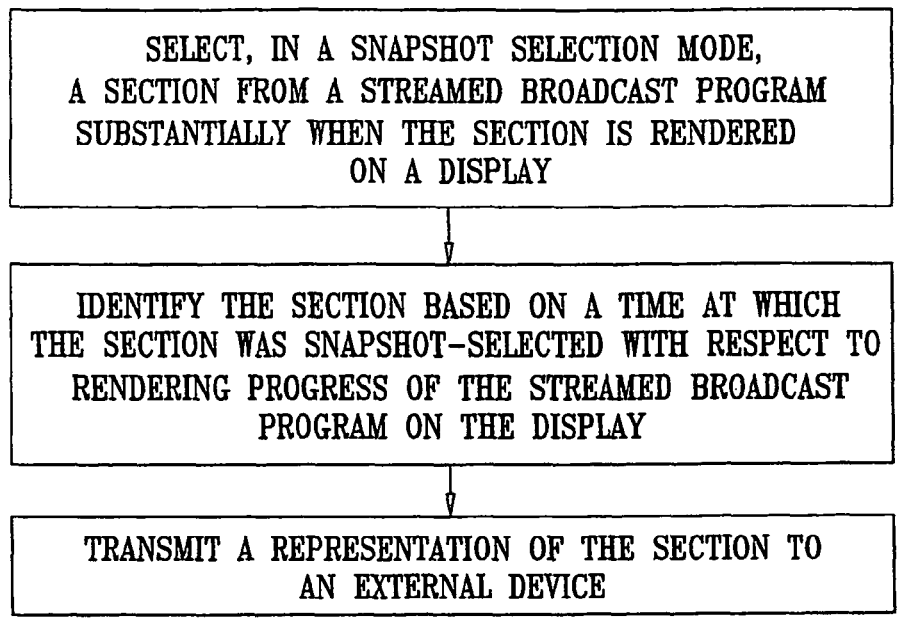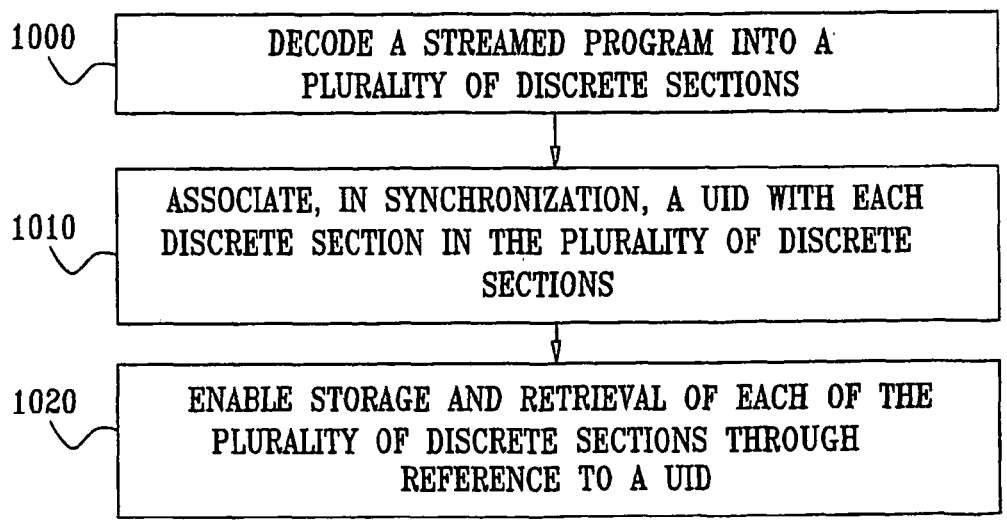

SYSTEM FOR TRANSMITTING INFORMATION FROM A STREAMED PROGRAM TO EXTERNAL DEVICES AND MEDIA

CROSS-REFERENCE TO RELATED APPLICATIONS

The present application claims priority from U.S. Provisional Patent Application Ser. No. 60/476,136, filed 5 Jun. 2003, and from U.S. Provisional Patent Application Ser. No. 60/551,714, filed 10 Mar. 2004, the disclosures of which are hereby incorporated herein by reference.

FIELD OF THE INVENTION

The present invention relates to interactive systems and more particularly to systems that provide services of transmitting information from a streamed broadcast program to external devices and media.

BACKGROUND OF THE INVENTION

Downloading tunes via the Internet for use as telephone rings for cellular telephones is well known in the art. Also known in the art is downloading images to cellular telephones via the Internet.

Some aspects of technologies and related art that may be useful in understanding the present invention are described in the following publications:

U.S. Pat. No. 5,606,365 to Maurinus et al, which describes an interactive camera for network processing of captured images;

Published US Patent application 2003/0167469 of Hardingham et al, which describes a method and system of offering for sale images related to a television program via interactive television;

Published PCT patent application WO 99/59339, which describes an interactive television system for selectively retrieving video images or teletext pages from a remote transmitter;

Published US Patent application 2003/0093786 of Amsellem, which describes an interactive television method and device;

Published PCT patent application WO 03/055217, which describes an interactive television commerce system that includes a video broadcast distribution network having multiple in-band and out-band channels;

Published PCT patent application WO 02/082796, which describes a video image display system that is used for interactive television, videoconferencing and telemonitoring;

Published PCT Application WO 01/35669 and U.S. patent application Ser. No. 09/574,096, both assigned to NDS Limited, which describe a method for processing a data stream including receiving a transport stream (TS), storing at least a portion of the TS, the at least a portion of the TS having a beginning and including a plurality of TS packets, determining, from among the plurality of TS packets, at least one TS packet including a candidate access point, storing in an index store a byte offset of the candidate access point; and storing in the index store a plurality of indications of byte offset, each byte offset being associated with an arrival time of a received TS packet;

Published PCT Application WO 03/010970, assigned to NDS Limited, which describes a method for accessing a desired point in time-synchronized data within a stream, the stream being associated with time information, the method including providing a desired presentation time associated with a desired point within a time-synchronized data stream, determining a stream access point, decoding the stream beginning at the stream access point, and assigning a time associated with the stream access point as a utilization time;

Published US Patent application 2003/0011636 of Feroglia et al, which describes a method for magnifying content;

an article entitled "Virtual Video Editing in Interactive Multimedia Applications", by Wendy E. Mackay and Glorianna Davenport in *Communications of the ACM*, Vol. 32, No. 7, July 1989, pages 802-810; and a description in the world-wide-web (WWW) site www.ntp.org, which refers to the Network Time Protocol (NTP).

The disclosures of all references mentioned above and throughout the specification, as well as the disclosures of all references mentioned in those references, are hereby incorporated herein by reference.

SUMMARY OF THE INVENTION

The present invention, in preferred embodiments thereof, seeks to provide apparatus, systems and methods for enabling individual determination and selection of information, such as images and rings, to be transmitted from a displayed streamed broadcast program, and for transmitting the individually determined information to external devices and media A non-limiting example of a displayed streamed broadcast program comprises a broadcast television program which is typically displayed on a television display.

Today, users can choose, via the Internet, only a limited number of rings and images from lists of rings and images that are predetermined by providers of the rings and the images. Users typically cannot make an arbitrary choice of rings and/or images from a streamed program, such as, for example, a streamed audio and video (A/V) program. Enabling individual determination and selection of rings and images to be transmitted to external devices and media from a streamed program makes it possible for users to have an individual "touch" with regards to usage of the external devices and media and is therefore considered desirable by the inventors of the present invention.

The external devices and media may include, for example, mobile telephones, and other personal computing, entertaining, printing, and communicating devices. The terms "mobile telephone" and "cellular telephone" are interchangeably used throughout the present specification and claims.

In a streamed program, rings and images are typically comprised in sections that are derived from the streamed program. The term "section" is used throughout the present specification and claims to include an element of a streamed program that may be used for various purposes independently from the streamed program. The purposes for which the section may be used include, for example, the following purposes: informational purposes; educational purposes; entertainment purposes; and indication purposes. For example, a section may include a video frame that may independently be used as a wallpaper image on a device, such as a mobile telephone. A section may alternatively include a plurality of video frames that provide, for example, movie scenes or a video clip that may be displayed, for example, on a mobile telephone for entertainment purposes. Further alternatively, a section may include an audio element, such as, for example, a music tune or speech that may be used as a ring tone on a mobile telephone. Yet alternatively, a section may include a combination of audio and video, such as, for example, a video frame combined with a music tune that may be rendered on a Personal Digital Assistant (PDA), for example, for educational or informational purposes. Still alternatively, a section may include a multimedia presentation, such as, for example, a presentation comprising text, an image and sounds that may be rendered on a mobile telephone for informational purposes.

The term "render" is used, in all its grammatical forms, throughout the present specification and claims to refer to any appropriate mechanism or method of making content palpable to one or more of the senses. In particular and without limiting the generality of the foregoing, "render" refers not only to display of video content but also to playback of audio content.

By way of example, the description below refers to transmission of representations of sections, where the sections comprise rings and images from television programs provided on an entertainment television channel. However, it is appreciated that the present invention is not limited to rings and images or to a specific channel or content provider, and a service for transmitting section representations from a streamed program may "fit" many broadcasters, assuming that the broadcasters have an appropriate type of content. The present invention is also not limited to television programs, and the service may alternatively be used for transmission of section representations from any other appropriate type of streamed broadcast programs, such as, for example, audio programs, video programs, and multimedia programs. A service for transmitting section representations from a streamed program is referred to below as a "snapshot service".

The terms "representation of a section" and "section representation" are interchangeably used throughout the present specification and claims to include one of the following: the section formatted in a format that is suitable for rendering on a rendering device; metadata related to the section; and the section formatted in a format that is suitable for rendering on a rendering device and associated with metadata related to the section. For example, a representation of a section comprising a video frame showing a person may include a bitmap of the video frame that may be used to construct, for example on a display of a mobile telephone, an image of the person as shown in the video frame.

The term "metadata" is used throughout the present specification and claims to include information descriptive of or otherwise referring to a content stream or a portion thereof, such as an interactive content stream. The metadata may include, for example, pointers, tags, codes, flags and indexing information. At least part of the metadata may be used to enable or disable interactive operations depending, for example, on values assigned to the tags or the flags. In a case where the content stream is associated with at least one television program, the pointers, tags, codes, flags and indexing information may point to, describe, and index segments of the at least one television program and portions of the content stream. It is appreciated that the contents of the metadata may preferably pertain to either a plurality of users or an individual user. The metadata may be used to enable operations on the at least one television program, if associated with the content stream, and/or on content in the content stream.

The present invention, in preferred embodiments thereof, also seeks to enable quick and simple use of a snapshot service because it is expected that users will act on impulse.

The present invention, in preferred embodiments thereof, further seeks to leave a target audience as much as possible in control of a final image and/or ring transmitted to their external devices.

The terms "tune", "ring" "polyphonic ring", and "ring tone" in singular or plural are interchangeably used throughout the present specification and claims to refer to music or sounds that may be used as a telephone ring or as background sounds for an application.

In a snapshot service that enables transmission of representations of sections taken from television, the snapshot service is preferably an integral part of watching television; that is, a user may decide to obtain sections comprising tunes and images while viewing, for example, the latest tunes presented in glamorous music videos on the entertainment television channel. A section selected for transmission in a snapshot service is also referred to throughout the present specification and claims as a "snapshot-selected section".

Taking advantage of interactive capabilities of interactive television (ITV), a user may be offered a high degree of freedom. Preferably, the user, who typically has a mobile telephone and is also a user of the mobile telephone, is offered the opportunity to take a "snapshot" of what the user believes to be the most preferred background image for the mobile telephone, whether it is an image of a favorite pop star, a cartoon image or any other preferred image, including, inter alia, a background environment image such as a landscape view. When the user presses, for example, a key on a television remote control, a visual effect, such as a flashy visual blitz effect, preferably appears on the television and a few minutes later the user preferably receives a background image on the mobile telephone.

It is appreciated that allowing individual determination and selection of an image may be attractive to many television viewers that are also users of cellular telephones and may enable them to add individual "statements" and/or "touch" to ways in which the users use their cellular telephones. Such individual statements and touch cannot be achieved by letting the viewers select between a limited range of background images of which they have no control.

Similar freedom is preferably offered in defining rings. The viewers are preferably enabled to "record" tunes of their liking and preference, for example by pressing "start" and "stop" at any point during a music video rendered on the television.

In a snapshot service that uses ITV, at least some processing regarding a snapshot-selected section is performed in a set-top box (STB) that is associated with a television display, or in a circuit providing STB functionality that is comprised in the television display. Additionally, a return path of the STB is typically used for communicating information regarding the snapshot-selected section to a headend. The term "STB" is used throughout the present specification and claims to refer to either a set-top box or a circuit providing STB functionality in a television display.

Preferably, the information communicated from the STB determines and identifies the snapshot-selected section or is used by the headend to determine and identify the snapshot-selected section. After the snapshot-selected section is determined and identified, a representation of the snapshot-selected section is preferably transmitted, for example to the mobile telephone of the user.

A snapshot service may also be offered to viewers of non-interactive television, such as viewers of conventional analog terrestrial television or viewers of one-way analog cable television systems. Such a snapshot service is referred to throughout the present specification and claims as an "analog snapshot service". The analog snapshot service makes use of a telephone and does not use processing regarding a snapshot-selected section in an STB and a return path of the STB, as in a snapshot service that uses ITV. The analog snapshot service is therefore suitable for larger audiences and larger varieties of markets than a snapshot service that uses ITV.

In the analog snapshot service, a viewer who watches television may press a telephone key at an instant when a desired image appears on television. A voice response system preferably registers the time the viewer has pressed the key, and based on such a registered time, a video frame including the desired image may be determined and a representation of the video frame may be transmitted to a mobile telephone of the viewer.

The viewer may similarly select a ring by, for example, pressing the telephone key at the beginning of the ring and pressing the telephone key again, or pressing another telephone key, at the end of the ring. The voice response system preferably registers the times when the telephone key (or keys) were pressed, and based on such registered times, the ring is preferably determined and a representation of the ring is transmitted to the mobile telephone of the viewer.

A snapshot service may also be offered to viewers of non-interactive digital television. Such a snapshot service is also provided using a voice response system similarly to the analog snapshot service.

There is thus provided in accordance with a preferred embodiment of the present invention a method for selecting a section from a streamed broadcast program, the method including receiving a streamed broadcast program, rendering the received streamed broadcast program on a display, selecting a section from the received streamed broadcast program substantially when the section is rendered on the display, and producing an indication signal which enables identification of the section based on a time at which selection of the section was carried out with respect to rendering progress of the streamed broadcast program on the display.

Additionally, the method also includes identifying the section based on the indication signal. The identifying preferably includes computing, based on the indication signal, a selection time representing the time at which the selection of the section was carried out within a rendering period of the streamed broadcast program on the display, and recognizing the section as a discrete section which, in a sequential series of discrete sections constructed from the streamed broadcast program, corresponds to the selection time.

Preferably, each of the sections in the sequential series of discrete sections is tagged with a unique identification (UID), and the recognizing includes determining a UID of the discrete section.

Additionally, the method also includes transmitting, in response to the identifying, a representation of the section to at least one of the following: an external device, and an external medium. The representation of the section preferably includes one of the following: the section formatted in a format that is suitable for rendering on a rendering device, metadata related to the section, and the section formatted in a format that is suitable for rendering on a rendering device and associated with metadata related to the section.

Alternatively, the method includes finding, in response to the identifying, a replacement section that relates to the section, and transmitting a representation of the replacement section to at least one of the following: an external device, and an external medium.

Preferably, the external device includes at least one of the following: a mobile telephone, a computing device, an entertainment device, a printer, and a communication device. The external medium preferably includes at least one of the following: a medium in the external device, and a medium attached to the external device. The external medium may include a memory stick.

Additionally, the method also includes receiving the representation of the section embedded in at least one of the following: a Multimedia Messaging Service (MMS) message, a Wireless Application Protocol (WAP) push message, a JAVA™ application, a Short Messaging Service (SMS) message, and an electronic-mail (e-mail) message.

Preferably, the representation of the section is suitable for at least one of the following: playing on the external device, displaying on the external device, editing via the external device, and transmitting to another external device.

Additionally, the method also includes editing the representation of the section. The editing preferably includes at least one of the following: cropping a displayed area of the representation of the section, reducing a displayed area of the representation of the section, and enlarging a displayed area of the representation of the section.

Further additionally, the method also includes returning editing values of section parameters in response to the editing. The returning preferably includes returning the editing values to a server. The server is preferably associated with a headend or included in a headend.

Preferably, the editing values include at least one of the following: picture display coordinates, picture size information, information regarding picture elements positions, and audio parameters.

Additionally, the method also includes processing the representation of the section and the editing values to produce a result including at least one of the following: an edited representation of the section, and a representation of a new section, and transmitting the result, in response to the processing, to at least one of the external device and the external medium.

The method may additionally include transmitting a request to receive at least one of the following: a representation of a section preceding the section in the streamed broadcast program, and a representation of a section following the section in the streamed broadcast program.

Preferably, the section includes at least one of the following: an audio section, a video section, an audio and video (A/V) section, and a multimedia section. The section may preferably include at least one of the following: a video frame, at least a portion of a tune, at least a portion of a video clip, at least a portion of an audio program, and at least a portion of a television program Preferably, the streamed broadcast program includes at least one of the following: a streamed audio program, a streamed video program, a streamed A/V program, and a streamed multimedia program. The streamed broadcast program may preferably include at least one of the following: a television program, an audio program, a video clip, an interactive television program, a multimedia program, and a multimedia presentation.

The identifying preferably includes identifying the section within an identification error range.

In accordance with a preferred aspect of the present invention the streamed broadcast program includes an analog program, the selecting includes pressing a key on a telephone keypad, and the computing includes computing the selection time at a voice response system. The analog program preferably includes at least one of the following: an audio program, a video program, an A/V program, and a multimedia program.

In accordance with another preferred aspect of the present invention the streamed broadcast program includes a digital program, the selecting includes pressing a key on a remote control (RC), and the computing includes computing the selection time at at least one of the following: a set-top box (STB), and a headend. The digital program preferably includes at least one of the following: an audio program, a video program, an A/V program, and a multimedia program.

Preferably, the producing includes producing the indication signal at an STB. Alternatively, the producing includes producing the indication signal at a headend. Further alternatively, the producing includes producing the indication signal at a voice response system.

Preferably, the identifying includes identifying the section at at least one of the following: a headend, and an STB.

The producing preferably includes producing the indication signal unless the streamed broadcast program is marked by a mark forbidding selection of the section. Alternatively, the producing includes producing the indication signal only if the streamed broadcast program is marked by a mark allowing selection of the section. The mark preferably includes a metadata code.

The method additionally includes generating, on the display, a visual effect in response to the selecting. The visual effect preferably includes at least one of the following: a flashy visual effect, a visual blitz effect, and a flashy visual blitz effect.

Further additionally, the method also includes inviting a user to enter a device identification code identifying an external device to which to transmit a representation of the section. The inviting preferably includes displaying, on the display, a message inviting the user to enter the device identification code. Alternatively, the inviting includes playing a message inviting the user to enter the device identification code.

Preferably, the transmitting includes producing an indication of agreement by a user to pay for the transmitting, and transmitting the representation of the section in response to the producing.

The editing preferably includes editing the representation of the section via one of the following: the external device, and an STB.

The method also preferably includes, prior to the selecting, inviting a user to select a desired section. The inviting preferably includes displaying a message inviting the user to select the desired section. Alternatively, the inviting includes playing a message inviting the user to select the desired section.

Additionally, the method also includes, prior to the selecting, accepting user input information including at least one of the following: a user's mobile telephone number, a source of a video signal received at one of the display and a user's STB, a user's mobile telephone type, an indication indicating a mobile operator that provides cellular services for the user's mobile telephone, and a target mobile telephone number.

In accordance with yet another preferred aspect of the present invention, the section includes a plurality of sub-sections, and the selecting includes selecting a start sub-section and a stop sub-section from the plurality of sub-sections. In such a preferred aspect of the present invention, the method also includes determining a timeout stop sub-section if the stop sub-section is not selected within a timeout period.

Also in such a preferred aspect of the present invention, the selecting includes selecting the start sub-section by pressing on a first key of an input device, and selecting the stop sub-section by pressing on a second key of the input device. Alternatively, the selecting includes selecting the start sub-section by pressing once on a key of an input device, and selecting the stop sub-section by pressing again on the key of the input device.

Preferably, the display includes at least one of the following: a television, a monitor of a computing device, a display of a mobile telephone, a display of an entertainment device, and a display of a communication device.

The transmitting preferably includes associating branding information identifying a provider of the section with the representation of the section. The branding information preferably includes an owner rights code.

Preferably, the UID includes an identifier based on a combination of values obtained from at least one of the following: a time code, a frame counter, and a discontinuation counter. The UID may also include an identifier derived from a received broadcast transmission.

Alternatively, the UID includes an identifier derived from time information provided by an external clock.

Preferably, the computing also includes performing computations correcting at least one of the following: synchronization inaccuracies in at least one clock of at least one sub-system that is involved in computation of the selection time, and effect of latencies in the at least one sub-system.

The method also preferably includes transmitting the UID of the section via at least one of the following: a return path of an STB, a wired communication link, and a wireless communication link.

In accordance with still another preferred aspect of the present invention, the recognizing includes finding a first preferred section and a second preferred section from a set of preferred sections representing the best sections of the sequential series of discrete sections, the first preferred section being the nearest preferred section before the discrete section that corresponds to the selection time, and the second preferred section being the nearest preferred section after the discrete section that corresponds to the selection time, and selecting the section as one of the first and the second preferred sections which is closer in the sequential series of discrete sections to the discrete section that corresponds to the selection time.

Preferably, the set of preferred sections includes predefined preferred sections.

Further preferably, the selecting includes selecting the section as one of the first and the second preferred sections in response to a determination of the streamed broadcast program as a preview.

Additionally in such a preferred aspect of the present invention, the method also includes enabling linked access to external information via the section.

There is also provided in accordance with another preferred embodiment of the present invention a method for obtaining at an external device a representation of a section, which section is obtained from a streamed broadcast program rendered on a display, the method including selecting, in a snapshot selection mode, a section from the streamed broadcast program substantially when the section is rendered on the display, identifying the section based on a time at which the section was snapshot-selected with respect to rendering progress of the streamed broadcast program on the display, and transmitting a representation of the section to the external device.

In accordance with yet another preferred embodiment of the present invention there is also provided a method for preparing a streamed program in a format suitable for transmission of discrete sections, the method including decoding a streamed program into a plurality of discrete sections, associating, in synchronization, a UID with each discrete section in the plurality of discrete sections, and enabling storage and retrieval of each of the plurality of discrete sections through reference to a UID.

Preferably, the streamed program includes one of the following: an analog program, and a digital program. Each of the analog program and the digital program preferably includes at least one of the following: an audio program, a video program, an A/V program, and a multimedia program.

Additionally, the method also includes preparing a set of preferred sections representing the best sections of the plurality of discrete sections.

Preferably, the decoding includes decoding the streamed program only if the streamed program is marked by a mark allowing transmission of discrete sections.

In accordance with a preferred aspect of the present invention the streamed program includes an MPEG encoded program, and the enabling includes enabling storage of MPEG sequences.

There is also provided in accordance with a preferred embodiment of the present invention apparatus for selecting a section from a streamed broadcast program, the apparatus including a receiving and rendering device receiving a streamed broadcast program and rendering the received streamed broadcast program on a display, a user selection unit enabling selection of a section from the received streamed broadcast program substantially when the section is rendered on the display, and a controller producing an indication signal which enables identification of the section based on a time at which selection of the section was carried out with respect to rendering progress of the streamed broadcast program on the display.

In accordance with another preferred embodiment of the present invention there is also provided a system for transmitting a representation of a section, which section is obtained from a streamed broadcast program rendered on a display, the system including a user selection unit enabling selection, in a snapshot selection mode, of a section from the streamed broadcast program substantially when the section is rendered on the display, an identifier unit identifying the section based on a time at which the section was snapshot-selected with respect to rendering progress of the streamed broadcast program on the display, and a transmitting unit transmitting a representation of the section to an external device.

In accordance with yet another preferred embodiment of the present invention there is also provided apparatus for preparing a streamed program in a format suitable for transmission of discrete sections, the apparatus including a decoder decoding a streamed program into a plurality of discrete sections, a unique identification (UID) control unit associating, in synchronization, a UID with each discrete section in the plurality of discrete sections, and a database interface enabling storage in a section database and retrieval from the section database of each of the plurality of discrete sections through reference to a UID.

BRIEF DESCRIPTION OF THE DRAWINGS

The present invention will be understood and appreciated more fully from the following detailed description, taken in conjunction with the drawings in which:

FIGS. 1A-1D are simplified pictorial illustrations of a preferred implementation of apparatus, in different operational states, for selecting a section from a streamed broadcast program rendered on a display, the apparatus being constructed and operative in accordance with a preferred embodiment of the present invention;

FIGS. 2A and 2B are simplified pictorial illustrations of another preferred implementation of apparatus, in different operational states, for selecting a section from a streamed broadcast program rendered on a display, the apparatus being constructed and operative in accordance with another preferred embodiment of the present invention;

FIGS. 3A and 3B are simplified pictorial illustrations depicting editing of a representation of a section transmitted from a streamed program;

FIGS. 4A-4E are simplified pictorial illustrations depicting editing of a representation of a section via an STB;

FIG. 12 is a simplified flowchart illustration of a preferred method of operation of any of the apparatus depicted in FIG. 6 and the apparatus depicted in FIG. 7; and FIG. 13 is a simplified flowchart illustration of a preferred method of operation of any of the iCapture element of FIG. 9 and the iCapture element of FIG. 10.

DETAILED DESCRIPTION OF A PREFERRED EMBODIMENT

Figure 1B:
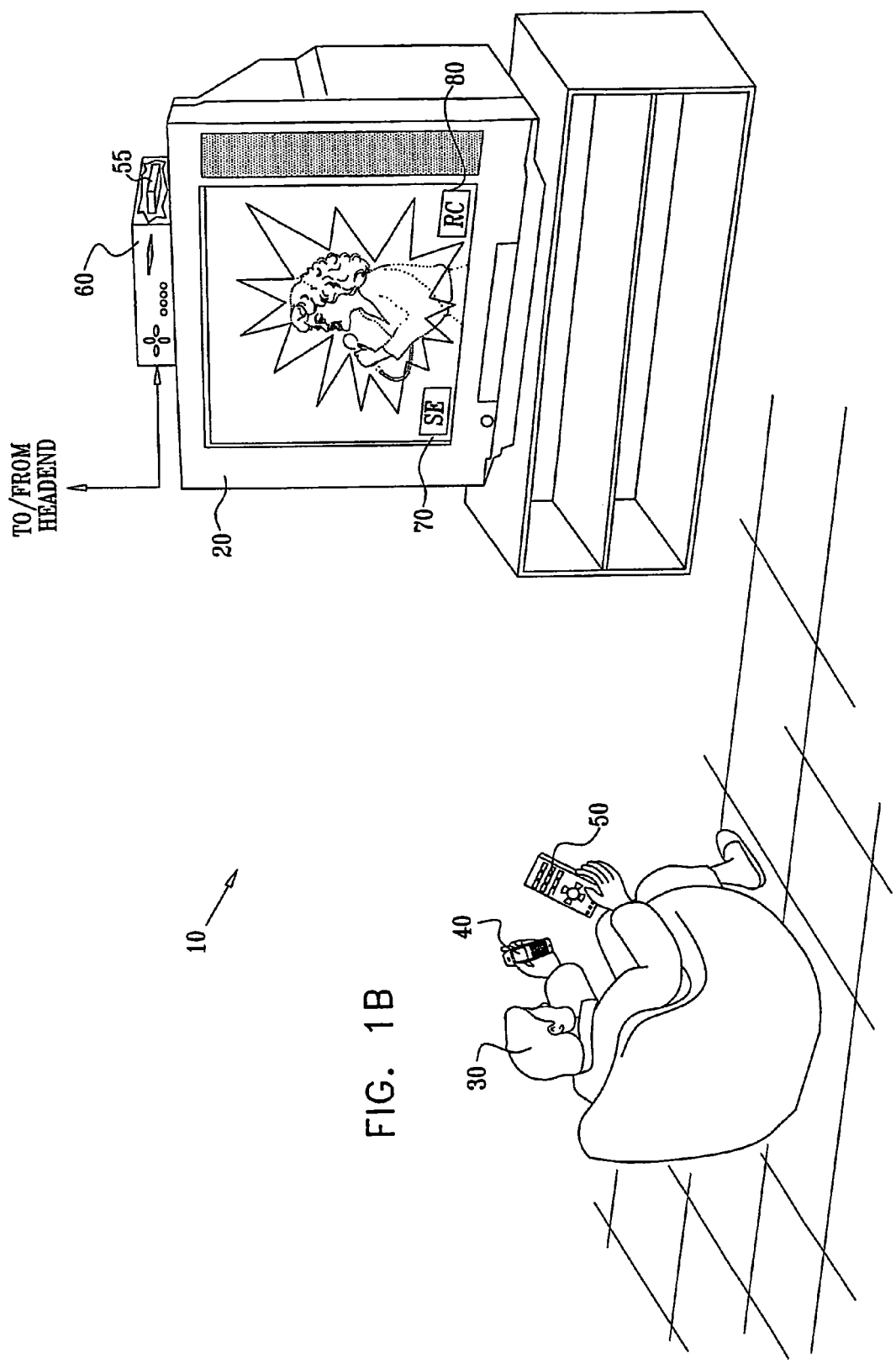

Reference is now made to FIGS. 1A-1D, which are simplified pictorial illustrations depicting a preferred implementation of apparatus 10 for selecting a section from a streamed broadcast program rendered on a display, the apparatus 10 being constructed and operative in accordance with a preferred embodiment of the present invention. The apparatus 10 is depicted in FIGS. 1A-1D in different operational states.

The streamed broadcast program preferably includes at least one of the following: a streamed audio program; a streamed video program; a streamed audio and video (A/V) program; and a streamed multimedia program. By way of example, which is not meant to be limiting, the streamed broadcast program may include at least one of the following: a television program; an audio program; a video clip; an interactive television (ITV) program; a multimedia program; and a multimedia presentation.

Further by way of example, which is not meant to be limiting, the streamed broadcast program mentioned with reference to FIGS. 1A-1D comprises a digital program.

The section is preferably derived from the streamed broadcast program. The section preferably includes at least one of the following: an audio section; a video section; an A/V section; and a multimedia section. By way of example, the section may include at least one of the following: a video frame; at least a portion of a tune; at least a portion of a video clip; at least a portion of an audio program; and at least a portion of a television program.

The display preferably includes at least one of the following: a television; a monitor of a computing device; a display of a mobile telephone; a display of an entertainment device; and a display of a communication device. By way of example, which is not meant to be limiting, the display on which the streamed broadcast program is rendered in FIGS. 1A-1D comprises a television display 20.

Reference is now specifically made to FIG. 1A.

The apparatus 10 may preferably be used by a user 30 in a snapshot service for transmitting a representation of a section, for example to an external device or an external medium The apparatus 10 may preferably be used when the user 30 views the streamed broadcast program on the television display 20.

The snapshot service preferably enables the user 30 to individually determine and select for transmission information which is displayed on the television display 20. Such information is also referred to throughout the present specification and claims as "snapshot-selected information". By transmitting the snapshot-selected information, for example, to an external device comprising a mobile telephone 40 of the user 30, the user 30 may create an individual statement, in terms of visuals and/or audio. For example, if the snapshot-selected information includes a background image, the background image may be used as a wallpaper image on the mobile telephone 40. If the snapshot-selected information includes a polyphonic ring, the polyphonic ring may be used as a start-up sound or a ring tone on the mobile telephone 40. The snapshot-selected information may thus distinguish a "look and feel" of the mobile telephone 40 from other mobile telephones of other users.

The snapshot-selected information may also, for example, be transmitted in an electronic-mail (e-mail) message, for example to a friend of the user 30. It is also possible to set-up related websites where users can submit various snapshot-selected information items for others to review and comment (but not copy), for participation in competitions, etc.

The snapshot-selected information is typically comprised in a section which is snapshot-selected (snapshot-selected section). The snapshot-selected information comprised in the snapshot-selected section may, for example, include an image or a ring.

It is appreciated that the section is preferably snapshot-selected at the discretion of the user 30 from the streamed broadcast program which is rendered on the television display 20.

For simplicity of depiction and description, and without limiting the generality of the foregoing, the description below refers to the mobile telephone 40 of the user 30 as an external device for which the snapshot service is intended and to which a representation of the snapshot-selected section is transmitted. However, it is appreciated that the present invention is not limited to mobile telephones as external devices, and other appropriate types of external devices may alternatively be used. The present invention is also not limited to the mobile telephone 40 of the user 30 as the external device to which the representation of the snapshot-selected section is transmitted; the representation of the snapshot-selected section may alternatively or additionally be transmitted to an external device other than the mobile telephone 40, such as, for example, a mobile telephone (not shown) of a friend of the user 30.

The other appropriate types of external devices (not shown) for which the snapshot service may be intended and to which a representation of the snapshot-selected section may be transmitted preferably include at least one of the following: a computing device; an entertainment device; a printer; and a communication device. Appropriate types of external medium (not shown) for which the snapshot service may be intended and to which a representation of the snapshot-selected section may be transmitted preferably include at least one of the following: a medium in an external device of any of the types mentioned above; and a medium attached to the external device. For example, an external medium may include a hard disk (HD) in an external device comprising, for example, a personal computer (PC), or a memory stick associated with an external device comprising, for example, a laptop PC.

The apparatus 10 preferably includes the following elements: a user selection unit; a controller; and a receiving and rendering device. The user selection unit may preferably include a user input device, such as, for example, a remote control (RC) 50. The controller may preferably include a controller 55 that may, for example, include a conventional micro-controller or a conventional micro-processor, or any other suitable processor or controller. The receiving and rendering device may preferably include an STB 60. The controller 55 may, for example, be comprised in or associated with the STB 60. The RC 50 may preferably be used to control operation of the STB 60.

The STB 60 is preferably operatively associated with the television display 20. Preferably, the STB 60 includes a return path to a headend (not shown). The return path may, for example, be provided by a telephonic modem or a cable modem (both not shown). The STB 60 preferably receives broadcast transmissions broadcast by the headend and renders the broadcast transmissions on the television display 20. The STB 60 may also transmit to the headend, via the return path, at least one of the following: user information entered by the user, for example, via the RC 50; billing information; and information to be used for management operations.

The broadcast transmissions typically include television programming, ITV programming, audio programming and, in some cases, multimedia programming. The streamed broadcast program is preferably comprised in the broadcast transmissions.

In operation, the streamed broadcast program is received at the STB 60, and the STB 60 preferably renders the received streamed broadcast program on the television display 20. The user 30 may use the apparatus 10 for taking a snapshot of a desired section from the streamed broadcast program which is rendered on the television display 20. By way of example, the streamed broadcast program may be a live show in which a singer is shown performing. The live show is provided, for example, on an entertainment television channel. Being, for example, a fan of the singer, the user 30 may want to snap a section comprising a picture of the singer from the streamed broadcast program for use as a background image on the mobile telephone 40. Alternatively, the user 30 may want to snap at least a portion of a song sung by the singer for use as a ring in the mobile telephone 40.

Opportunities to take such a snapshot are preferably indicated or promoted, for example, by displaying a snapshot enabled (SE) icon 70 and a remote control reference icon 80 on the television display 20. Alternatively or additionally, opportunities to take snapshots may be indicated or promoted by inviting the user 30 to select a desired section. It is appreciated that the user 30 may be invited to select the desired section by displaying a message (not shown) or playing a message (not shown) inviting the user 30 to select the desired section.

In the operational state depicted in FIG. 1A, the user 30 is shown selecting a section from the received streamed broadcast program substantially when the section is rendered on the television display 20. The user 30 may preferably select the section, for example, by pressing a dedicated key on the RC 50, such as the yellow key, at an instant when the section is rendered on the television display 20. Pressing the key on the RC 50 is preferably translated, for example in the STB 60, to an instruction to instantly snap the section.

In response to the user 30 selecting the section, a visual effect may preferably be generated and displayed on the television display 20 as shown in the operational state depicted in FIG. 1B. The visual effect may preferably include at least one of the following: a flashy visual effect; a visual blitz effect; and a flashy visual blitz effect. The term "flashy visual effect" is used throughout the present specification and claims to include a visual effect which is similar to a visual effect resulting from a camera flash operation. The term "visual blitz effect" is used throughout the present specification and claims to include any appropriate visual effect which is visible for a short time period. The term "flashy visual blitz effect" is used throughout the present specification and claims to include an effect which is both visual for a short time period and similar to a visual effect resulting from a camera flash operation.

It is appreciated that the visual effect may be generated as the user 30 selects the section, or shortly thereafter. The visual effect preferably indicates a picture being currently taken. For example, in a case where the visual effect comprises a flashy visual blitz effect, the visual effect is preferably visible for a short time period equivalent to display of a few video frames starting from a picture frame being snapped.

In a case where the section includes only audio, an audible signal may replace the visual effect.

It is appreciated that although selection accuracy cannot typically be guaranteed, it is expected that the user 30 may be able to select the section with a satisfactory accuracy because displaying the visual effect typically resembles a flash usage in a conventional film camera. Since many users have learned to operate film cameras in a satisfactory way, it is anticipated that taking a snapshot may also be learned, enabling provision of satisfactory results.

Also in response to the user 30 selecting the section, the controller 55 in the STB 60 preferably produces an indication signal which enables identification of the section based on a time at which selection of the section was carried out with respect to rendering progress of the streamed broadcast program on the television display 20. Alternatively, the indication signal may be produced at headend equipment (not shown) at the headend in response to receipt of an input from the controller 55.

It is appreciated that the indication signal is preferably produced unless the streamed broadcast program is marked by a mark forbidding selection of the section. Alternatively, the indication signal is preferably produced only if the streamed broadcast program is marked by a mark allowing selection of the section. The mark preferably includes a metadata code.

After the section has been selected, that is "snapped", the user 30 is preferably invited to enter a device identification code that identifies a target external device to which to transmit a representation of the snapshot-selected section. The term "device identification code" is used throughout the present specification and claims to include a code that identifies an external device or an external medium. The device identification code typically includes numerals and/or characters. The device identification code may, for example, include at least one of the following: a dial number; a name; an electronic-mail address; a string of characters; a string of numbers; and a string including a combination of characters and numbers.

The term "target external device" is used throughout the present specification and claims to include any external device or external medium of the types mentioned above for which transmission of a representation of a snapshot-selected section is intended.

By way of example, which is not meant to be limiting, the description below refers to a dial number as a device identification code which identifies the target external device, but it is appreciated that the target external device may alternatively be identified by any other appropriate type of device identification code.

Figure 1C:
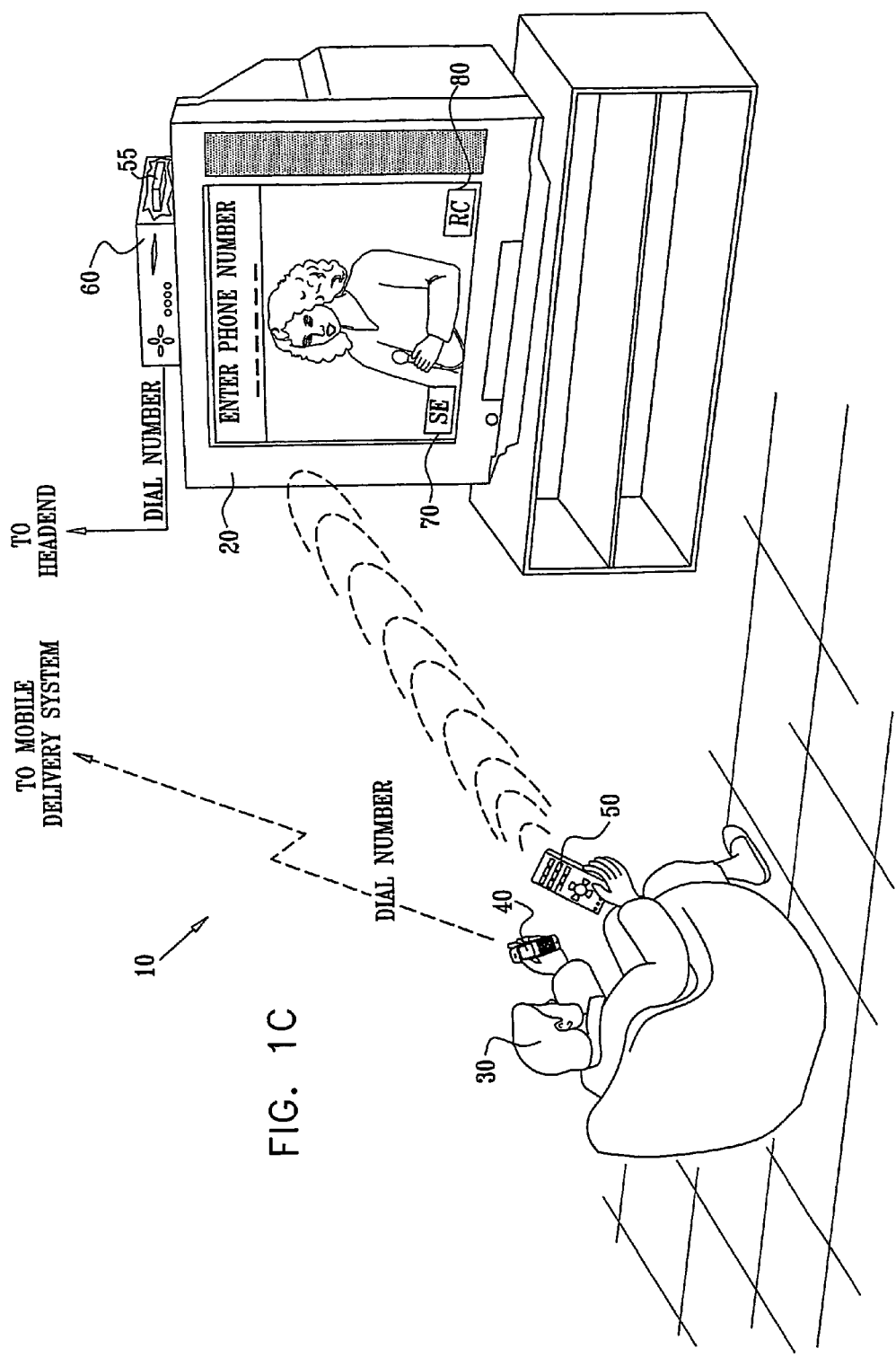

It is appreciated that the user 30 may, for example, be invited to enter the dial number by displaying on the television display 20 a message inviting the user to enter the dial number as shown in the operational state depicted in FIG. 1C. Alternatively, the user 30 may be invited to enter the dial number by playing a message inviting the user to enter the dial number.

In response to the message inviting the user to enter the dial number, the user 30 may preferably enter the dial number, for example, by pressing corresponding numeral keys on the RC 50. In the operational state depicted in FIG. 1C, the user 30 is shown pressing a key on the RC 50 as part of entering the dial number.

It is appreciated that in a case where the target external device is the mobile telephone 40, the user 30 may enter the dial number of the mobile telephone 40 in advance as a default pre-programmed dial number, in which case the operational state of FIG. 1C may be optional. Alternatively or additionally, the user 30 may be presented with a message requesting the user 30 to confirm that the representation of the snapshot-selected section is to be transmitted to the mobile telephone 40.

Additional information may also be entered or requested. For example, prior or subsequent to selecting the section, one or more screens may be displayed to the user 30 in which the user 30 may be requested to enter user input information comprising at least one of the following: a source of a video signal received at the STB 60, such as a cable source or a source for transmission via satellite; a type of the mobile telephone 40; and an indication indicating a mobile operator that provides cellular services for the mobile telephone 40.

It is appreciated that information regarding a mobile telephone type and a mobile operator may also be requested for a target external device other than the mobile telephone 40, in which case the user 30 may enter such information before or after entering the dial number of the target external device.

In accordance with another preferred embodiment of the present invention the user 30 may pre-register to the snapshot service, at which time the user 30 may preferably enter the dial number and the user input information. Then, each time the user 30 wants to use the snapshot service the user 30 is only requested to input minimal identifying information, such as, for example, a password. In accordance with yet another preferred embodiment of the present invention, after the user 30 pre-registers to the snapshot service, the dial number may be automatically identified using CLI (Calling Line Identification) of a telephone number of the user 30 so that the user 30 need not explicitly enter any identifying data at all. In accordance with still another preferred embodiment of the present invention, the dial number and the user input information entered on pre-registration may be stored as a "cookie" in the STB 60 and provided automatically to the headend during a callback via the return path, as is well known in the art.

The user input information, as well as the default pre-programmed dial number, may, for example, be stored in a memory (not shown) that is associated with the controller 55.

After the dial number is entered by the user 30 or otherwise obtained from the memory, one or more validation and confirmation pop-up screens may be presented to the user 30 as part of a procedure for order confirmation and monetary transaction for payment for the snapshot service. In such a procedure, an indication of agreement by the user 30 to pay for usage of the snapshot service for transmitting the representation of the section may be produced, for example at the STB 60 and/or at the headend. It is appreciated that the payment may be in the form of a micro-payment, as is well known in the art. It is further appreciated that for promotion purposes some snapshot transmissions may be provided for free whereas others may be provided for a price. It is further appreciated that snapshots from different streamed broadcast programs may be differently priced.

The operational state depicted in FIG. 1D refers to a state after the dial number was entered by the user 30 or otherwise obtained from the memory, and after the indication of agreement by the user 30 to pay for usage of the snapshot service for transmission of the representation of the section was produced, confirmed and validated. In such a case, the section is preferably identified based on the indication signal, that is, ultimately on the time at which the selection of the section was carried out with respect to rendering progress of the streamed broadcast program on the television display 20. Preferably, identification of the section is carried out at at least one of the following: the headend; and the STB 60. It is appreciated that the identification of the section at the headend may preferably be carried out at the headend equipment.

In a case where the identification of the section is carried out at the STB 60, the STB 60 may, for example, be assisted by timing information transmitted from the headend. The ability to identify the section at the STB 60 typically depends on processing power and memory capacity of the STB 60. For example, an STB comprising or associated with a personal video recorder (PVR), such as an XTV™ system, commercially available from NDS Limited, One London Road, Staines, Middlesex, TW18 4EX, United Kingdom, may have appropriate processing power and memory capacity for identifying the section.

Preferably, the identification of the section is performed by computing or deriving, based on the indication signal, a selection time representing the time at which the selection of the section was carried out within a rendering period of the streamed broadcast program on the television display 20, and recognizing the section as a discrete section which, in a sequential series of discrete sections constructed from the streamed broadcast program, corresponds to the selection time. Each of the sections in the sequential series of discrete sections is preferably tagged with a unique identification (UID), and the section is preferably recognized by determining a UID of the discrete section. The selection time is preferably computed at at least one of the following: the STB 60; and the headend equipment.

The UID of the discrete section, which now becomes the UID of the snapshot-selected section, is obtained either at the STB 60 or at the headend depending on where the identification of the section is carried out. If the identification of the section is carried out at the STB 60, the STB 60 preferably transmits the UID of the section to the headend equipment via at least one of the following: the return path; a wired communication link; and a wireless communication link.

Based on the UID, the headend equipment preferably obtains the section and provides, for example through a server (not shown) associated with the headend equipment and/or comprised in the headend, a representation of the section to a mobile delivery system (not shown) that may comprise, for example and without limiting the generality of the foregoing, a Multimedia Messaging Service (MMS) gateway (not shown). The representation of the section may preferably be prepared and formatted in a format that is supported by the mobile telephone 40, such as, for example, a Portable Network Graphics (PNG) format or a Joint Photographic Experts Group (JPEG) format. It is appreciated that in a case where the representation of the section is to be transmitted to an external device other than the mobile telephone 40, the format in which the representation of the section is prepared preferably corresponds to a format supported by the external device other than the mobile telephone 40.

The mobile delivery system preferably transmits the representation of the section to the target external device, that is, the mobile telephone 40. It is appreciated that if the user 30 has specified, in the operational state of FIG. 1C, an external device other than the mobile telephone 40 or an external medium as the target external device, the mobile delivery system preferably transmits the representation of the section to the external device other than the mobile telephone 40 or to the external medium.

In a case where the representation of the section comprises metadata related to the section, the metadata may, for example, include information that may be of use to the user 30. For example, the metadata related to the section may include statistics information about an actor in the streamed broadcast program or specifically about an actor that appears in the section, offers to buy products that may be associated with the actor, etc.

It is appreciated that in some cases the user 30 may want to receive a representation of a replacement section that relates to the section rather than the representation of the section. For example, instead of receiving an image of an actor that appears in the section, the user 30 may want to receive a picture of the actor when the actor was a baby. In such a case, once the UID is identified and obtained, the headend equipment preferably finds the replacement section, that may preferably be tagged with a sub-UID or otherwise mapped to the UID of the section, and provides a representation of the replacement section to the mobile delivery system for transmission to the mobile telephone 40. The replacement section may, for example, be retrieved from a database (not shown) of replacement sections.

For simplicity of depiction and description, and without limiting the generality of the foregoing, the description below refers to a representation of a section but it is appreciated that a representation of a replacement section may alternatively be treated and referred to.

Preferably, the mobile delivery system transmits the representation of the section to the mobile telephone 40 embedded in at least one of the following: an MMS message; a Wireless Application Protocol (WAP) push message; a JAVA™ application; a Short Messaging Service (SMS) message; and an e-mail message.

After the user 30 receives the representation of the section at the mobile telephone 40, the user 30 may use the representation of the section on the mobile telephone 40. Preferably, the representation of the section is suitable for at least one of the following: playing on the mobile telephone 40; displaying on the mobile telephone 40; editing via the mobile telephone 40; and transmitting to another external device (not shown).

Editing via the mobile telephone 40 is enabled if the representation of the section is received at the mobile telephone 40 embedded in a JAVA™ application or if the mobile telephone 40 has advanced editing software that enables editing of the representation of the section when the section representation is embedded in other message types. If the representation of the section is received at the mobile telephone 40 embedded in one of an MMS message, a WAP push message, an SMS message, and an e-mail message, and the mobile telephone 40 does not have appropriate corresponding editing software, the representation of the section may, for example, be edited via the STB 60.

In a case where the user 30 chooses to edit the representation of the section, a new communication session is typically performed in order to obtain a representation of a new section that corresponds to a requested editing. The new communication session is typically performed because the JAVA™ application, for example, does not typically have access to a memory (not shown) in the mobile telephone 40 and thus the JAVA™ application cannot store editing information or a resulting edited section representation in the memory of the mobile telephone 40. It is appreciated that access to the memory of the mobile telephone 40 is typically restricted in order to protect vital information, such as telephone numbers, that is typically stored in the memory of the mobile telephone 40. However, if the memory of mobile telephone 40 has a capacity for storage of editing information or edited section representations separately from and in addition to the vital information, performance of the new communication session to obtain the representation of the new section may be optional.

The new communication session may be performed either via the return path to the headend or via a cellular communication session via the mobile delivery system Editing of the representation of the section preferably results in generation of editing values of section parameters that comprise, for example and without limiting the generality of the foregoing, at least one of the following: picture display coordinates; picture size information; information regarding picture elements positions; and audio parameters. The editing values are preferably returned to the server. The server preferably processes the representation of the section and uses the editing values to produce the representation of the new section, and transmits the representation of the new section to the mobile telephone 40 via the mobile delivery system.

If the representation of the section is to be edited via the STB 60, the representation of the section may be transmitted, for example via the return path, to the STB 60. By way of example, which is not meant to be limiting, the representation of the section may be transmitted as a bitmap in the bit-mapped graphics (BMP) format or as a still image in an MPEG (Moving Picture Experts Group) format. The user 30 may then preferably edit the bitmap or the still image when displayed on the television display 20. When the user 30 terminates editing of the representation of the section, editing values resulting from the editing are preferably communicated from the STB 60 to the server via the return path. The server preferably processes the representation of the section, and the editing values to produce a result comprising at least one of the following: an edited representation of the section; and a representation of a new section. The result is then sent to the mobile telephone 40.

It is appreciated that instead of or in addition to editing the representation of the section, the user 30 may choose to request that a representation of a previous or following section be transmitted to the mobile telephone 40. In such a case, the user 30 may, for example, use the mobile telephone 40 to initiate a snapshot transmission transaction in which a request to obtain another section representation is transmitted to the headend via the mobile delivery system. The user 30 may preferably include in the request a specification of a newly requested section whose section representation is requested. The specification of the newly requested section may, for example, include an indication of whether the newly requested section precedes or follows the snapshot-selected section in the streamed program, and an indication of a number of sections by which the newly requested section precedes or follows the snapshot-selected section in the streamed program. Based on the specification of the newly requested section, the headend may transmit a section representation of the newly requested section to the mobile telephone 40 via the mobile delivery system.

It is appreciated that the request to obtain another section representation may alternatively be transmitted to the headend in a snapshot transmission transaction conducted via the return path of the STB 60, in which case the user 30 may use the RC 50 to enter the specification of the newly requested section.

Typically, the representation of the section is received at the mobile telephone 40 a short time period after the user 30 has snapshot-selected the section. The short time period may, for example, be a few minutes long and rendering of the streamed broadcast program on the television display 20 typically continues during the short time period. The representation of the section received at the mobile telephone 40 corresponds to the section that was displayed on the television display 20 at the time the section was snapshot-selected.

It is appreciated that the snapshot service also preferably offers an opportunity to increase brand loyalty of users because, similarly to use of pictures in an album, the users may want to show obtained snapshots to other people. For such a purpose, the transmitted representation of the section is preferably associated with branding information identifying a provider of the section. The branding information preferably includes an owner rights code, and, for example, a logo of the provider embedded in the representation of the section for marketing promotion purposes. The owner rights code may preferably be comprised in metadata related to the section.

In a case where the user 30 wants to snap at least a portion of a song sung by the singer for use as a ring on the mobile telephone 40, a desired section selected by the user 30 will typically cover an interval within which at least a portion of the song is performed. Such an interval is also referred to throughout the present specification and claims as an "audio interval". The desired section then preferably includes a plurality of sub-sections covering the audio interval, and the user 30 preferably selects a start sub-section and a stop sub-section from the plurality of sub-sections. The start sub-section then corresponds to a beginning of the ring and the stop sub-section corresponds to an end of the ring.

The term "sub-section" is used throughout the present specification and claims to include a portion of a section. For example, in a case where the section includes a video clip comprising a plurality of video frames, a sub-section of the section may, for example, include any one of the video frames. In a case where the section includes, for example, a three-minutes long audio clip comprising a song, a sub-section of the section may, for example, include any one-second long part of the audio clip.

Preferably, the user 30 selects the start sub-section by pressing on a first key of the RC 50, and the stop sub-section by pressing on a second key of the RC 50. Alternatively, the user 30 may select the start sub-section by pressing once on a key of the RC 50, such as the blue key, and the stop sub-section by pressing again on the blue key.

It is appreciated that, if the user 30 does not select the stop sub-section within a timeout period, the controller 55 may determine a timeout stop sub-section and use the timeout stop sub-section as an actual stop sub-section, thus automatically terminating snapshot taking after the timeout period.

Once the desired section covering the audio interval in the song is selected by the user 30, operations corresponding to operations mentioned above with reference to snapping the picture of the singer may be performed in a similar manner. Such operations include, inter alia, identification, transmission, editing, and usage of the desired section.

In a case where the user 30 wants to snap more than one picture of the singer, such as a portion of a video clip or a commercial, a desired section selected by the user 30 will typically cover an interval within which a plurality of video frames are displayed. Such an interval is also referred to throughout the present specification and claims as a "video interval". In such a case, selection of the video interval may be performed as in the case of the audio interval, and operations corresponding to operations mentioned above with reference to snapping the at least a portion of the song may be performed in a similar manner.

In general, it is appreciated that the present invention enables a concept of "An item that can be snapped can be transmitted".

Reference is now made to FIGS. 2A and 2B, which are simplified pictorial illustrations of another preferred implementation of apparatus 100 for selecting a section from a streamed broadcast program rendered on a display, the apparatus 100 being constructed and operative in accordance with another preferred embodiment of the present invention. The apparatus 100 is depicted in FIGS. 2A and 2B in different operational states.

The apparatus 100 is particularly useful for enabling an analog snapshot service in non-interactive television systems. Non-interactive television systems typically include conventional analog terrestrial television systems and one-way analog cable television systems. Conventional analog terrestrial television typically does not use STBs, and STBs in some analog cable television systems do not have return paths. Therefore, a solution that does not involve STBs is preferably used in order to enable the analog snapshot service in non-interactive television systems. It is anticipated that such a solution may fit larger audiences and larger varieties of markets than a snapshot service that uses STBs because worldwide penetration of interactive television is still lower than penetration of conventional analog terrestrial television and one-way analog cable television.

It is appreciated that the apparatus 100 may also be useful for enabling a snapshot service in digital television systems, such as digital cable or satellite television systems, for example in cases where return paths from STBs are not available or are temporarily unusable.

By way of example, which is not meant to be limiting, the apparatus 100 is mentioned with reference to FIGS. 2A and 2B in the context of an analog snapshot service, and the streamed broadcast program mentioned with reference to FIGS. 2A and 2B includes an analog program. The section, which is preferably derived from the analog program, is also analog in form. The analog program preferably includes at least one of the following: an audio program; a video program; an A/V program; and a multimedia program. By way of example, the streamed broadcast program may preferably include at least one of the following: a television program; an audio program; a video clip; and a multimedia program.

In respect of the analog program, an analog multimedia program may include, for example, a combination of at least two of the following: audio; video; and text.

The section preferably includes at least one of the following: an audio section; a video section; an A/V section; and a multimedia section. By way of example, the section may preferably include at least one of the following: a video frame; at least a portion of a tune; at least a portion of a video clip; at least a portion of an audio program; and at least a portion of a television program The display may preferably be similar to the display mentioned above with reference to FIGS. 1A-1D. By way of example, which is not meant to be limiting, the display on which the analog program is rendered in FIGS. 2A and 2B comprises a television display 110.

Reference is now specifically made to FIG. 2A.

The apparatus 100 may preferably be used by a user 120 for obtaining a representation of a section, for example at a mobile telephone 130 of the user 120. Alternatively or additionally, the apparatus 100 may be used by the user 120 for placing an order to transmit the representation of the section to another mobile telephone, such as, for example, a mobile telephone (not shown) of a friend of the user 120. The section is preferably selected at the discretion of the user 120 from the streamed broadcast program which is rendered on the television display 110.

Similarly to the apparatus 10 of FIGS. 1A-1D, the apparatus 100 preferably includes a user selection unit, a controller, and a receiving and rendering device. The user selection unit in the apparatus 100 is implemented via a telephone keypad 140 which is preferably comprised in a telephone, such as, for example, the mobile telephone 130. Alternatively, the user selection unit may be implemented via a telephone keypad (not shown) comprised in a conventional wired telephone (not shown).

The controller preferably includes a controller 150 that may be comprised in or associated with a voice response system (VRS) 160 which is typically remote from the mobile telephone 130. The controller 150 may, for example, include a conventional micro-controller or a conventional micro-processor, or any other suitable processor or controller.

The receiving and rendering device of the apparatus 100 may, for example, be implemented via the television display 110 or via an antenna (not shown) associated with the television display 110.

In operation, the user 120 preferably uses the mobile telephone 130 for placing a call to the VRS 160 in order to initiate a snapshot session enabling the user 120 to take a snapshot of a desired section from the streamed broadcast program A telephone number of the VRS 160 may, for example, be provided by a provider of the analog snapshot service and displayed on the television display 110 when the analog snapshot service is made available.

The session thus initiated by the user 120 is preferably responded by the VRS 160. The VRS 160 may, for example, introduce and explain the analog snapshot service, and request the user 120 to input information typically including a telephone number of the mobile telephone 130 and an indication of agreement by the user 120 to pay for usage of the analog snapshot service. It is appreciated that entering the telephone number of the mobile telephone 130 may be optional in a case where the VRS 160 may autodetect the telephone number of the mobile telephone 130, or in a case where the user 120 pre-registers to the analog snapshot service as mentioned above with reference to FIGS. 1A-1D.

After the user 120 enters the information, the VRS 160 preferably processes and validates the information. After the information entered by the user 120 is validated, the VRS 160 is ready to accept a selection from the user 120. The VRS 160 then preferably prompts the user 120 to make an individual determination and selection of information to be transmitted, by way of example to the mobile telephone 130. The user 120 then waits until a desired section appears on the television display 110.

When the user 120 notes the desired section on the television display 110, the user 120 preferably selects the desired section by pressing a key on the keypad 140 of the mobile telephone 130. The VRS 160 preferably records such a key press and computes a selection time at which the user 120 has pressed the key on the keypad 140. It is appreciated that the VRS 160 may compute the selection time by using, for example, an input from an external clock (not shown). Based on recording of the key press and computation of the selection time, the VRS 160 preferably produces an indication signal which enables identification of the section based on a time at which selection of the section was carried out with respect to rendering progress of the streamed broadcast program on the television display 110.

Preferably, the VRS 160 transmits the indication signal to a headend (not shown) where the section is preferably identified based on the indication signal. Identification of the section may, for example, be performed as mentioned above with reference to FIGS. 1A-1D by computing, or alternatively deriving, the selection time, and recognizing the section as a discrete section which, in a sequential series of discrete sections constructed from the streamed broadcast program, corresponds to the selection time. Preferably, each of the sections in the sequential series of discrete sections is tagged with a UID, and the section is recognized by determining a UID of the discrete section.

After the section is identified, the headend preferably obtains the section and provides, for example through a server (not shown) at the headend, a representation of the section to a mobile delivery system (not shown) that may comprise, for example and without limiting the generality of the foregoing, an MMS gateway (not shown). The mobile delivery system preferably transmits the representation of the section to the mobile telephone 130 as shown in FIG. 2B. The representation of the section received at the mobile telephone 130 may, for example, be used as a wallpaper presentation or a start-up sound. It is appreciated that the user 120 may also edit the representation of the section via the mobile telephone 130.

In a case where the user 120 chooses to edit the representation of the section, a new communication session is typically performed in order to obtain a representation of a new section that corresponds to a requested editing. The new communication session is preferably performed via a cellular communication session to the mobile delivery system. The editing of the representation of the section preferably results in generation of editing values of section parameters that comprise, for example and without limiting the generality of the foregoing, at least one of the following: picture display coordinates; picture size information; information regarding picture elements positions; and audio parameters. The mobile delivery system preferably provides the editing values to the server. The server preferably processes the representation of the section and uses the editing values to produce the representation of the new section, and transmits the representation of the new section to the mobile telephone 130 via the mobile delivery system.

It is appreciated that instead of or in addition to editing the representation of the section, the user 120 may choose to request that a representation of a previous or following section be transmitted to the mobile telephone 130. Such a request is preferably transmitted and treated as mentioned above with reference to FIGS. 1A-1D.

In order to reduce costs associated with cellular communication sessions, the user 120 may alternatively use a conventional wired telephone for communication with the VRS 160 and for selection of the section. In such a case, the user 120 may select the section by pressing a key on a keypad of the wired telephone, and once the section is selected and identified, the section may be transmitted to the mobile telephone 130 via the mobile delivery system.

In a case where the user 120 wants to snap a section comprising a video interval or an audio interval, selection of the section may be performed by pressing a key (or keys) on the keypad 140 to select a start sub-section and a stop sub-section as mentioned above with reference to FIGS. 1A-1D. The VRS 160 preferably determines times at which the start sub-section and the stop sub-section were selected, and based on a determination of such times generates indication signals that are transmitted to the headend. The headend identifies the start sub-section and the stop sub-section, and transmits, via the mobile delivery system, the section comprising sub-sections between the start sub-section and the stop sub-section.

It is appreciated that when using a snapshot service, regardless of whether the service is used with a streamed digital program or a streamed analog program, a user using the service may want to receive a section having a higher quality than a section being actually snapped, since snapping a section may result in a less-than-optimal result. The higher quality may be expressed in terms of, for example, viewing angles of items in the section, display of a complete item as opposed to display of a part of the item, etc. In such a case, when preparing a sequential series of discrete sections from a streamed digital program or a streamed analog program, a set of preferred sections representing the best sections of the sequential series of discrete sections may also be prepared. It is appreciated that preparation of the sequential series of discrete sections is typically made automatically, but preparation of the set of preferred sections typically involves pre-definition of the preferred sections by an operator.

In order to transmit, from a streamed digital program or from a streamed analog program, a section having a higher quality than a section being actually snapped, section identification is preferably altered so that a section to be transmitted is no longer a snapped section but rather a preferred section. Preferably, after computation of a selection time of the snapped section, the section to be transmitted is recognized by finding a first preferred section and a second preferred section from the set of preferred sections, where the first preferred section is the nearest preferred section before the snapped section, and the second preferred section is the nearest preferred section after the snapped section, and selecting the section to be transmitted as one of the first and the second preferred sections which is closer in the sequential series of discrete sections to the snapped section. Preferably, linked access to external information is enabled via the section to be transmitted.

It is appreciated that such replacement of the snapped section by a preferred section may preferably be performed in response to a determination of the streamed program as a preview.

It is further appreciated that in any of the apparatus 10 of FIGS. 1A-1D and the apparatus 100 of FIGS. 2A and 2B a snapped section or a preferred section may be ordered in a hard copy form, for example by a user inputting an appropriate input parameter. In such a case, a representation of the snapped section or the preferred section may be printed and sent, for example by mail, to the user.

Reference is now made to FIGS. 3A and 3B, which are simplified pictorial illustrations depicting editing of a representation of a section transmitted from a streamed program. The representation of the section is, by way of example, transmitted by a server (not shown) as part of a first snapshot transmission transaction.

It is appreciated that the representation of the section may be transmitted either from a streamed digital program or from a streamed analog program Furthermore, editing of the representation of the section does not depend on whether the representation of the section was transmitted from a streamed digital program or from a streamed analog program, and similar editing operations may be performed on a representation of a section transmitted from a streamed digital program and on a representation of a section transmitted from a streamed analog program.

By way of example, editing of the transmitted representation of the section is shown in FIGS. 3A and 3B to occur via the mobile telephone 40 of FIGS. 1A-1D, but it is appreciated that similar editing may be performed via the mobile telephone 130 of FIGS. 2A and 2B, or on via any other appropriate type of external device mentioned above. It is further appreciated that in a case where the section was selected via an STB, such as the STB 60 of FIGS. 1A-1D, and the representation of the section was transmitted from a streamed digital program rendered via the STB, editing of the transmitted representation of the section may alternatively be performed via the STB.

Further by way of example, the transmitted representation of the section comprises an image, for example, a picture of a singer.

Still further by way of example, the editing of the representation of the section via the mobile telephone 40 is performed by the user 30 of FIGS. 1A-1D (not shown in FIGS. 3A and 3B).

Preferably, editing of the representation of the section includes at least one of the following: cropping a displayed area of the representation of the section; reducing a displayed area of the representation of the section; and enlarging a displayed area of the representation of the section.

The image as received is shown in FIG. 3A. If the user 30 prefers to maintain the image as received, the user 30 may select a "COOL" option meaning that the user 30 is satisfied with the image as received. Selection of the COOL option may, for example, be performed by pressing numeral key "1" on the mobile telephone 40.

If the user 30 is not satisfied with the image as received, the user 30 may select a "CROP" option, for example, by pressing numeral key "3" on the mobile telephone 40, in order to get a different rendering of the singer as shown in FIG. 3B. When the user 30 selects the CROP option, a proportional focus area of the image is, for example, brought forward. The proportional focus area of the image may then preferably be moved around a display screen 180 of the mobile telephone 40, for example by pressing conventional arrow keys 185 of the mobile telephone 40. Also, by pressing another set of keys, such as "+" and "−" if available, or numeral keys, it may be possible to reduce or enlarge the focus area of the image.

After the user 30 completes making editing changes, a second snapshot transmission transaction is initiated and carried out, for example through a communication session over the mobile telephone 40, to obtain another image that corresponds to a requested editing. The second snapshot transmission transaction is preferably performed similarly to the first snapshot transmission transaction. Preferably, editing of the image returns editing values to the server, which will then transmit a representation of a new section or a representation of an edited section to the mobile telephone 40.

Reference is now made to FIGS. 4A-4E, which are simplified pictorial illustrations depicting editing of a representation of a section via an STB. The representation of the section is preferably received in a first snapshot transmission transaction.

Preferably, editing of the representation of the section via the STB is similar to editing of a representation of a section as described above with reference to FIGS. 3A and 3B. By way of example, which is not meant to be limiting, in FIGS. 4A-4E the STB comprises the STB 60 of FIGS. 1A-1D, the representation of the section comprises an image, for example, a picture of a singer, and the representation of the section is displayed on a display comprising the television display 20 of FIGS. 1A-1D.

Editing of the representation of the section via the STB is carried out by selecting a "CROP" option for getting a different rendering of the image. When the CROP option is selected, a proportional focus area of the image is determined, moved around the television display 20, and reduced or enlarged. FIGS. 4C and 4E show different renderings of the image resulting from different crops of the image. The different renderings of the image may, for example, be obtained through performance of additional snapshot transmission transactions that may be performed similarly to the first snapshot transmission transaction.

Figure 5:
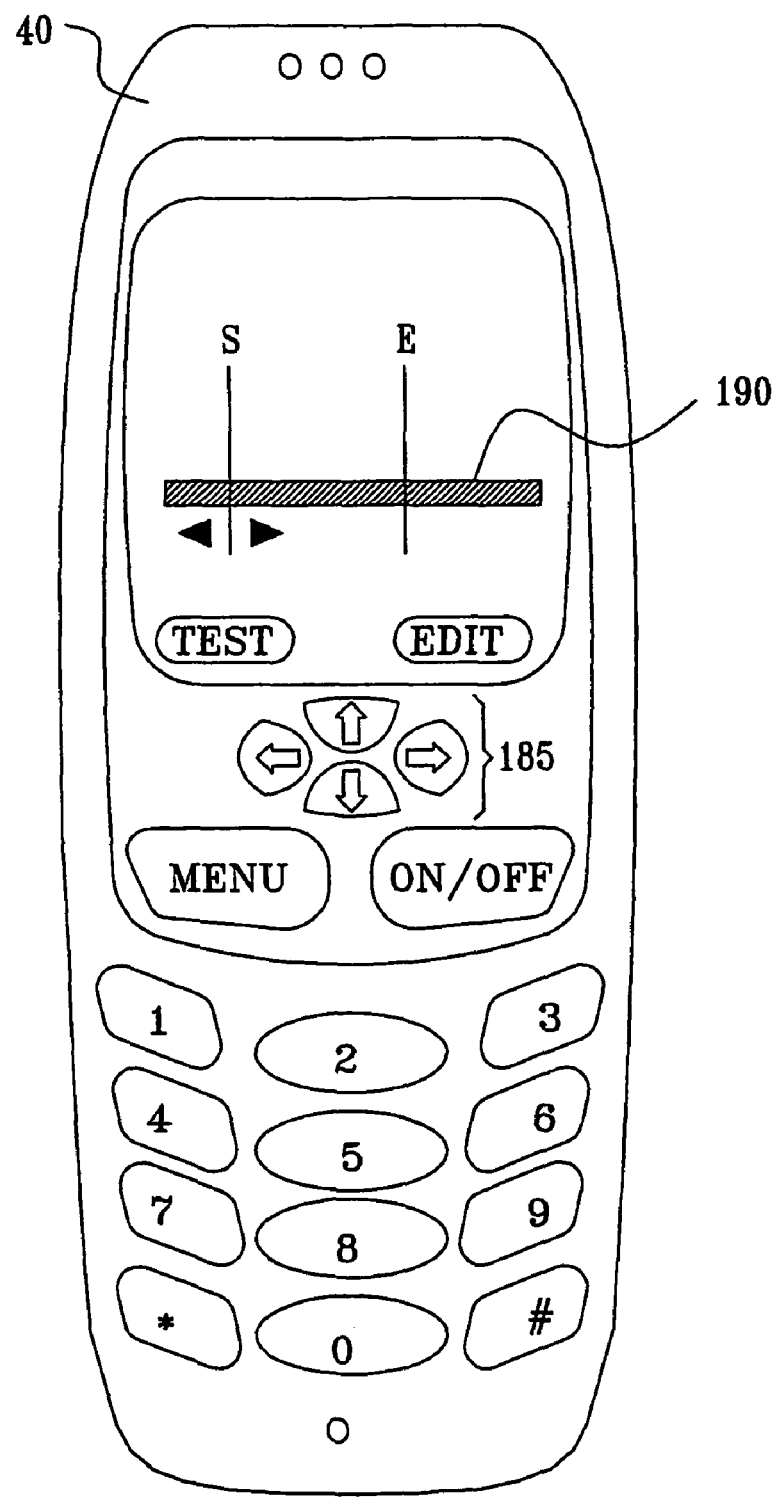
FIG. 5 is a simplified pictorial illustration depicting editing of a representation of a section comprising a plurality of sub-sections.

Reference is now made to FIG. 5, which is a simplified pictorial illustration depicting editing of a representation of a section comprising a plurality of sub-sections. The representation of the section is preferably received in a snapshot transmission transaction.

The sub-sections typically cover an interval, such as an audio interval or a video interval, having a beginning and an end. Editing of the representation of the section may thus include, for example, selecting only some of the plurality of sub-sections thus decreasing interval length. Selection of only some of the plurality of sub-sections may be performed by selectively adjusting a start sub-section and a stop sub-section of the section.

By way of example, which is not meant to be limiting, in FIG. 5 the representation of the section comprises a polyphonic ring, the representation of the section is played on the mobile telephone 40 of FIGS. 1A-1D, and the editing of the representation of the section is performed on a display of the mobile telephone 40.

Preferably, a recording interval 190, and incrementing bars marked "S" (for "start") and "E" (for "end") cutting the recording interval 190 are displayed on the display of the mobile telephone 40. Using, for example, keys, such as the conventional arrow keys 185 of the mobile telephone 40, the representation of the section may be edited by moving at least one of the incrementing bars S and E along the recording interval 190 to the left or to the right, thus selectively adjusting a start sub-section and a stop sub-section of the section.

It is appreciated that the bars S and E also provide an easy-to-read indication of a length of sub-section recording and may also indicate that the sub-section recording has started.

A similar recording interval and similar incrementing bars S and E may be used in editing of the representation of the section in a case where the representation of the section comprises a plurality of images. In such a case, however, the recording interval and the bars S and E may, for example, be displayed in an overlay overlaid over the images.

If the mobile telephone 40 has a capability of implementing editing changes to the polyphonic ring or the plurality of images, the editing changes are preferably implemented by the mobile telephone 40 once editing is terminated. However, if the mobile telephone 40 does not have the capability of implementing editing changes, additional snapshot transmission transactions are preferably conducted, similarly to the snapshot transmission transaction, in order to implement the editing changes.

Figure 6:
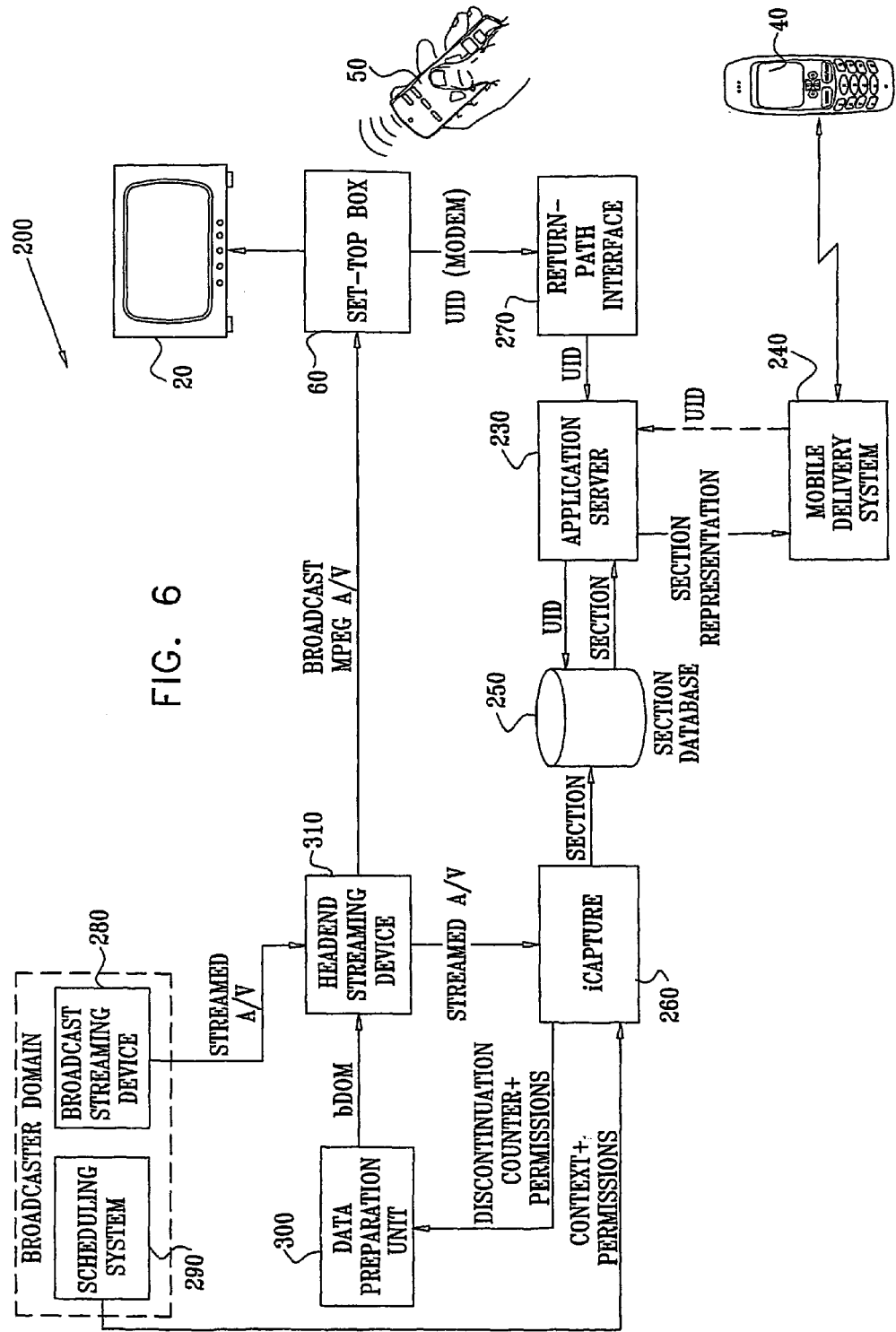
FIG. 6 is a simplified partly pictorial, partly block diagram illustration of a preferred implementation of the apparatus of FIGS. 1A-1D including headend and broadcaster elements that are not shown in FIGS. 1A-1D.

Reference is now made to FIG. 6, which is a simplified partly pictorial, partly block diagram illustration of a preferred implementation of the apparatus 10 of FIGS. 1A-1D including headend and broadcaster elements that are not shown in FIGS. 1A-1D. The apparatus 10 and the headend and broadcaster elements are shown in FIG. 6 as parts of a system 200 for transmitting a representation of a section from a streamed digital broadcast program Preferably, the system 200 includes the following elements: a user selection unit; an identifier unit 230; and a transmitting unit 240.

The user selection unit may, for example, include a remote control controlling operation of an STB, such as, for example, the RC 50 that controls operation of the STB 60 of FIGS. 1A-1D. The RC 50 preferably enables selection, in a snapshot selection mode, of a section substantially when the section is rendered by the STB 60 on the television display 20 of FIGS. 1A-1D.

The identifier unit 230 preferably identifies the section based on a time at which the section was snapshot-selected with respect to rendering progress of the streamed digital broadcast program on the television display 20. The identifier unit 230 preferably includes an application server. The application server 230 is preferably operatively associated with a section database 250 which is also preferably comprised in the system 200. The section database 250 is preferably operatively associated with a section recorder element 260 indicated "iCapture" that is also preferably comprised in the system 200. The application server 230 is preferably operatively associated with the STB 60 via a return path interface 270 comprising, for example, a modem.

The transmitting unit 240 preferably transmits a representation of the section to an external device. By way of example, which is not meant to be limiting, the transmitting unit 240 includes a mobile delivery system, and the external device includes the mobile telephone 40 of FIGS. 1A-1D. It is however appreciated that the external device may alternatively include any other appropriate external device as mentioned above with reference to FIGS. 1A-1D.

The system 200 also preferably includes broadcaster elements comprising the following: a broadcast streaming device 280; and a scheduling system 290. The system 200 further preferably includes headend elements comprising the following: a data preparation unit 300; and a headend streaming device 310.

It is appreciated that the broadcaster elements, the headend elements, the iCapture element 260, the section database 250, and the application server 230 may, for example, be all comprised in a headend.

The headend streaming device 310 is preferably operatively associated with the following elements: the broadcast streaming device 280; the data preparation unit 300; and the iCapture element 260. The broadcast streaming device 280 preferably provides the streamed digital program to the headend streaming device 310, and the headend streaming device 310 preferably broadcasts the streamed digital program to the STB 60, for example in an MPEG digital format. The headend streaming device 310 also preferably provides the streamed digital program to the iCapture element 260, preferably in the MPEG digital format.

The iCapture element 260 is also preferably operatively associated with the following elements: the data preparation unit 300; and the scheduling system 290.

The iCapture element 260 preferably captures the streamed digital program, decodes the streamed digital program into a sequential series of discrete sections, and stores each of the discrete sections in the section database 250. The section database 250 is preferably sufficiently large to hold a significant history of sections. Preferably, the iCapture element 260 attaches to each section a UID that uniquely identifies the section for retrieval. A more detailed description of a preferred implementation of the iCapture element 260 is provided below with reference to FIG. 9.

It is appreciated that in the case where the streamed digital program is broadcast in the MPEG format, a required storage capacity of the section database 250 may be reduced if the iCapture element 260 is enabled to store in the section database 250 MPEG sequences in an MPEG format rather than discrete sections. An MPEG sequence is the smallest piece of an MPEG stream that can be decoded without any additional information. Storage of MPEG sequences is generally more economical than storage of discrete sections. Additionally, extraction of sections from an MPEG sequence is a fast and simple operation, and decoding of the MPEG sequence is relatively simple.

In order to operate on the streamed digital program which is provided in a digital format, such as the MPEG format, the iCapture element 260 preferably comprises elements that process a digital stream as described below with reference to FIG. 9. However, there are cases in which the headend streaming device 310 also broadcasts analog transmissions in an analog format, for example to user units (not shown) of one-way analog cable television systems (not shown). In such cases, the headend streaming device 310 may convert the streamed digital program into an analog stream and output the analog stream rather than a digital stream to the iCapture element 260. In order to operate on such an analog stream, the iCapture element 260 may alternatively comprise elements that process an analog stream as described below with reference to FIG. 10, and may output discrete sections for storage in the section database 250 in a format that offers a good quality, such as, for example, the PNG format which is useful for image storage.

The application server 230 is preferably responsible for retrieving sections from the section database 250 in response to requests for snapshot-selected sections received from a user, such as, for example, the user 30 of FIGS. 1A-1D. The requests may preferably be provided to the application server 230 via the STB 60 and/or the mobile telephone 40 and the mobile delivery system 240.

Preferably, the application server 230 processes the requests and generates replies to the mobile telephone 40. The requests preferably include UIDs and the replies preferably include the corresponding sections. It is appreciated that the application server 230 may preferably support and serve requests from a plurality of users (not shown) simultaneously.

The replies are preferably transmitted through the mobile delivery system 240. The mobile delivery system 240 may also receive requests for additional sections from the mobile telephone 40 and provide the requests to the application server 230. The mobile delivery system 240 may further receive editing values of section parameters that result from editing operations and provide the editing values to the application server 230.

The requests may be transmitted in various methods. In a first method, a UID may be transmitted via the return path interface 270 of the STB 60, for example together with a specified telephone number for which a corresponding snapshot-selected section is intended, such as, for example, a telephone number of the mobile telephone 40. Transmission via the return path interface 270 does not typically involve user intervention. However, in a case where, for example, communication latency is high, transmission via the return path interface 270 may not be practical.

In a second method, the UID is preferably displayed on the television display 20 together with a message inviting the user 30 to send a text message, for example an SMS message including the UID to the application server 230. The application server 230 may then preferably return a representation of the section having the corresponding UID. A disadvantage of using the second method is that typing errors or other human errors may be introduced during construction of the text message.

It is appreciated that the two methods may be combined so that by default the return path interface 270 is used, but if an error occurs or the modem has not been connected, the user 30 is presented with a message on the television display 20 requesting the user 30 to send a text message with the UID.

Preferably, identification, by the identifier unit 230, of a section selected by the user 30 via the RC 50 may be performed in various identification modes. Each identification mode ultimately translates a selection time of the section to a UID of a discrete section in the sequential series of discrete sections prepared by the iCapture element 260. It is appreciated that the identification of the section, in any identification mode, may be performed within an identification error range. The identification error range, in any identification mode, is typically smaller than a typical inaccuracy range of selection of the section by the user 30.

By way of example, which is not meant to be limiting, the selected section referred to below comprises a single video frame, and the identifier unit 230 identifies the video frame from a sequential series of discrete video frames constructed by the iCapture element 260 from the streamed digital program broadcasted in the MPEG digital format.

In a first identification mode, an identifier is preferably constructed based on a combination of values obtained from at least one of the following: a time code; a frame counter; and a discontinuation counter. The identifier is preferably comprised in the UID.

The time code is typically an integral part of a conventional MPEG stream. The time code is attached approximately every ½ second.

The frame counter specifies how many video frames have passed since the latest change in the time code was detected. The frame counter may preferably be implemented by monitoring time codes in the STB 60 when the streamed digital program is displayed on the television display 20.

Preferably, the latest received time code is inspected once every ¹⁄₂₅ second. If a new time code is found, it is stored and the frame counter is set to zero. If the same time code is received again, the frame counter is incremented. A similar computation of the frame counter is preferably performed by the iCapture element 260.

The frame counter is based on a clock of the STB 60. There is a risk that the clock of the STB 60 may drift slightly so that the video frame cannot be exactly identified. However, latency in a reaction time of the user 30 selecting the video frame is typically much higher than such a drift and therefore the drift of the clock of the STB 60 is typically acceptable.

The combination of the time code and the frame counter is not always sufficient to make a complete unique identification of the video frame because the time code may have discontinuities. Discontinuities may be caused, for example, by changing or rebooting of MPEG encoding equipment (not shown) in any of the headend elements, and/or if pieces of pre-encoded MPEG material are comprised in the broadcasted streamed digital program.

The discontinuities may, for example, cause two different frames to have the same time code. In order to distinguish between two different frames having the same time code, discontinuities may preferably be counted in a discontinuation counter in both the iCapture element 260 and the STB 60. The discontinuation counter is preferably incremented each time a time code in the broadcasted streamed digital program is not continuous.

In order not to interfere with regular channel changing at the STB 60, the iCapture element 260 preferably broadcasts a current discontinuation counter value on a separate data stream encoded, for example and without limiting the generality of the present invention, as a document in bDOM (broadcast Document Object Model) which is commercially available from NDS Ltd., One London Road, Staines, Middlesex TW18 4EX, United Kingdom. The identifier comprised in the UID may thus also comprise an identifier that is partially based upon discontinuation counter information derived from a received broadcast transmission.

It is appreciated that the discontinuation counter value may be broadcast encoded as a document in bDOM because if a discontinuity occurs it is preferred to inform the STB 60 quickly of the discontinuity and bDOM is an appropriate candidate for informing the STB 60 of the discontinuity because bDOM has a feature that enables transmission of information to STBs quickly. It is however appreciated that another appropriate encoding of the discontinuation counter value may alternatively be used.

After a period of monitoring the discontinuation counter and time codes being broadcast, the STB 60 is typically fully synchronized with the application server 230 and the video frame may be uniquely identified.

Alternatively, the headend streaming device 310 and the iCapture element 260 associated therewith may be configured such that discontinuities will occur with negligible frequency. For example, the time code may be taken from a headend clock (not shown) rather than from material being broadcast, and the headend streaming device 310 may have appropriate redundancy measures that enable high availability, as is well-known in the art. In such a case, counting the discontinuities in both the iCapture element 260 and the STB 60 is optional.

A second identification mode may be used in cases where the first identification mode is not viable, for example due to limitations in headend equipment or STB middleware.

The second identification mode is particularly useful in a case where the streamed digital program may be broadcast with a constant and fixed broadcast latency. STBs useful for such a case may include any appropriate STBs such as, for example and without limiting the generality of the invention, STBs of a Media Highway™ system, which is commercially available from NDS Limited, One London Road, Staines, Middlesex, TW18 4EX, United Kingdom.

In such a case, a unique number may be broadcast from the iCapture element 260 to the STB 60 which, for example, comprises a Media Highway™ STB. Since the broadcast latency is constant, the STB 60 is able to compute when the number was sent from the iCapture element 260. The STB 60 may therefore compute a unique identification based on the latest received number and a time that has passed since the latest received number was received. Identical computations can also be performed by the iCapture element 260, and it is therefore possible to compare results of such computations for correct identification of a snapped section.

It is appreciated that in the cases where the iCapture element 260 receives an analog stream rather than a digital stream from the headend streaming device 310, the data preparation unit 300 is optional and the identification of the video frame may be performed in another identification mode that is based on an identifier derived from time information provided by a conventional external clock (not shown) as described below with reference to FIG. 7.

The video frame is preferably selected by the user 30 via a user interface that interfaces with the STB 60. The user interface preferably includes the RC 50 and menu screens (not shown) on the television display 20. The menu screens enable the user 30 to perform the following operations: load the snapshot selection mode; input a target telephone number; and select a section from the streamed digital broadcast program rendered on the display 20. Selections from the menu screens may, for example, be performed by pressing appropriate keys on the RC 50.

After selection of the video frame, the user 30 may also use the menu screens to approve the selection and a payment, and to allow the selection to be transmitted to the application server 230.

It is appreciated that in a section comprising a plurality of video frames, a start sub-section and a stop sub-section are preferably identified and identification of each of the start sub-section and the stop sub-section is preferably performed similarly to identification of the single video frame. A section comprising audio, such as a section comprising a tune, may be identified similarly to a section comprising a plurality of video frames.

Figure 7:
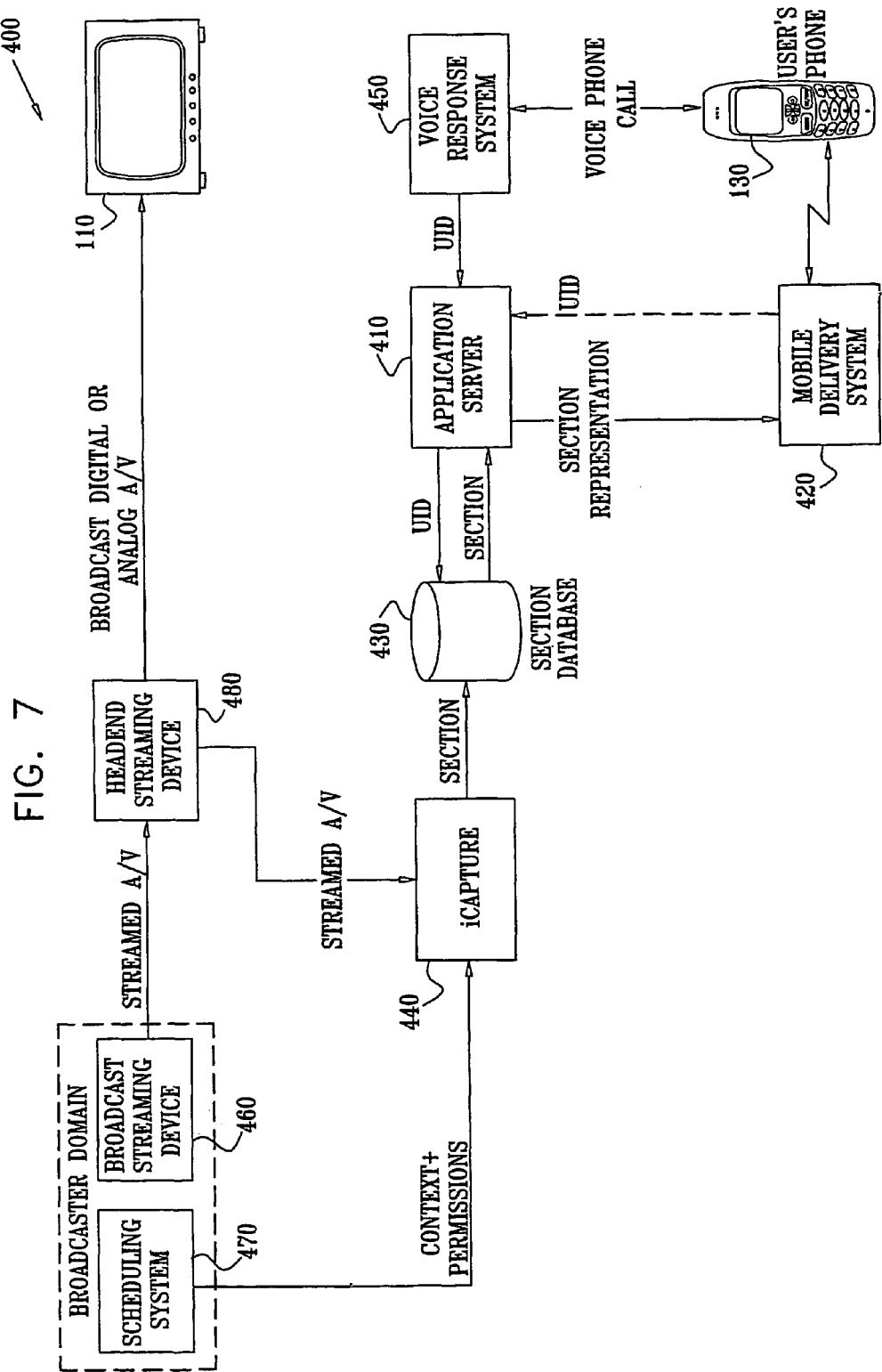
FIG. 7 is a simplified partly pictorial, partly block diagram illustration of a preferred implementation of the apparatus of FIGS. 2A and 2B including headend and broadcaster elements that are not shown in FIGS. 2A and 2B.

Reference is now made to FIG. 7, which is a simplified partly pictorial, partly block diagram illustration of a preferred implementation of the apparatus 100 of FIGS. 2A and 2B including headend and broadcaster elements that are not shown in FIGS. 2A and 2B. The apparatus 100 and the headend and broadcaster elements are shown in FIG. 7 as parts of a system 400 for transmitting a representation of a section from a streamed broadcast program rendered on the television display 110 of FIGS. 2A and 2B. The streamed broadcast program may include an analog program or a digital program.

By way of example, which is not meant to be limiting, the streamed broadcast program mentioned with reference to FIG. 7 comprises a streamed analog program, and the section, which is preferably derived from the analog program, is also analog in form. It is however appreciated that the streamed broadcast program may alternatively comprise a streamed digital program.

Preferably, the system 400 includes the following elements: a user selection unit comprising, for example, the mobile telephone 130 of FIGS. 2A and 2B; an identifier unit 410; and a transmitting unit 420.

In the system 400, the mobile telephone 130 is preferably used to enable selection, in a snapshot selection mode, of a section substantially when the section is rendered on the television display 110.

The identifier unit 410 is preferably similar in structure and function to the identifier unit 230 of FIG. 6, and similarly includes an application server. The transmitting unit 420 is preferably similar in structure and function to the transmitting unit 240 of FIG. 6, and similarly includes a mobile delivery system. The transmitting unit 420 preferably transmits a representation of the section to the mobile telephone 130. The mobile telephone 130 thus serves, in the system 400, as both a user selection unit and a target external device to which the representation of the section is transmitted.

Similarly to the system 200 of FIG. 6, the system 400 also preferably includes a section database 430 and a section recorder element 440 indicated "iCapture". Preferably, the iCapture element 440 comprises elements that process a digital stream as described below with reference to FIG. 9, in which case streamed sections inputted to the iCapture element 440 are preferably in a digital format, such as, for example, an MPEG format. Alternatively, the iCapture element 440 comprises elements that process an analog stream as described below with reference to FIG. 10, in which case streamed sections inputted to the iCapture element 440 are preferably in an analog format.

The section database 430 is preferably operatively associated with the iCapture element 440 and the application server 410. Preferably, the iCapture element 440 captures the streamed program, decodes the streamed program into a sequential series of discrete sections, and stores each of the discrete sections in the section database 430. In a case where the iCapture element 440 comprises elements that process a digital stream and streamed sections inputted to the iCapture element 440 are in a digital format, the iCapture element 440 preferably stores in the section database 430 discrete sections in the digital format or MPEG sequences in a case where the digital format comprises an MPEG format. In a case where the iCapture element 440 comprises elements that process an analog stream and streamed sections inputted to the iCapture element 440 are in an analog format, the iCapture element 440 preferably stores in the section database 430 discrete sections in a format that offers a good quality, such as, for example, the PNG format which is useful for image storage.

It is appreciated that the section database 430 is preferably sufficiently large to hold a significant history of sections. Preferably, the iCapture element 440 attaches to each section a UID that uniquely identifies the section for retrieval. It is appreciated that attachment of UIDs is based on a conventional external clock (not shown) that is used to identify when the iCapture element 440 has received sections. A more detailed description of a preferred implementation of the iCapture element 440 is provided below with reference to FIG. 10.

The system 400 also preferably includes broadcaster elements comprising the following: a broadcast streaming device 460; and a scheduling system 470. The system 400 further preferably includes a headend element comprising a headend streaming device 480. The headend streaming device 480 is preferably operatively associated with the broadcast streaming device 460 and the iCapture element 440. The iCapture element 440 is also operatively associated with the scheduling system 470. The headend streaming device 480 preferably broadcasts the streamed program and also provides the streamed program to the iCapture element 440 in the digital format or in the analog format.

It is appreciated that the broadcaster elements, the headend element, the iCapture element 440, the section database 430, and the application server 410 may, for example, be all comprised in a headend.

Preferably, a user interface in the system 400 enables selection of the section by a user, such as, for example, the user 120 of FIGS. 2A and 2B. The user interface preferably includes a VRS 450 and the mobile telephone 130. The VRS 450 is preferably operatively associated with the application server 410, and with the mobile telephone 130 via, for example, a cellular communication link. The VRS 450 may be implemented in any appropriate combination of hardware and software, and may, for example, comprise a conventional voice response system that directs a telephone user to different menu options in response to the telephone user pressing on different telephone keys.

The application server 410 is preferably responsible for retrieving sections from the section database 430 in response to requests for snapshot-selected sections received from the user 120. The requests may preferably be provided to the application server 410 via the mobile telephone 130 and the VRS 450 and/or via the mobile telephone 130 and the mobile delivery system 420.

Preferably, the application server 410 processes the requests and generates replies to the mobile telephone 130. The requests preferably include UIDs and the replies preferably include the corresponding sections. It is appreciated that the application server 410 may preferably support and serve requests from a plurality of users (not shown) simultaneously.

The replies are preferably transmitted through the mobile delivery system 420. The mobile delivery system 420 or the VRS 450 may also receive requests for additional sections from the mobile telephone 130 and provide the requests to the application server 410. The mobile delivery system 420 may further receive from the mobile telephone 130 editing values of section parameters that result from editing operations and provide the editing values to the application server 410.

As in the system 200 of FIG. 6, identification of a section selected by the user 120 ultimately translates a selection time of the section to a UID of a discrete section in the sequential series of discrete sections. However, in the system 400 the VRS 450 transmits the UID to the application server 410.

By way of example, which is not meant to be limiting, the selected section referred to below comprises a single video frame which is selected in an analog snapshot service from the streamed analog program which is rendered on the television display 110.

Preferably, the user 120 selects the video frame by pressing a key on the mobile telephone 130 substantially when the video frame is rendered on the television display 110. Identification of the video frame is based upon an identifier derived from time information provided by a conventional external clock (not shown). The identifier may preferably be produced in the VRS 450 that also preferably generates and records a determination of a selection time representing the time at which selection of the video frame was carried out within a rendering period of the streamed analog program on the television display 110. After the selection time is determined, the corresponding video frame may be found and retrieved from the section database 430. It is appreciated that the selection time may, if necessary, be adjusted based on a computed broadcast latency.

It is appreciated that the identification of the video frame may be performed within an identification error range. The identification error range is typically smaller than a typical inaccuracy range of the selection of the video frame by the user 120.

It is further appreciated that in a section comprising a plurality of video frames, a start sub-section and a stop sub-section are preferably identified and identification of each of the start sub-section and the stop sub-section is preferably performed similarly to identification of the single video frame. A section comprising audio, such as a section comprising a tune, may be identified similarly to a section comprising a plurality of video frames.

Preferably, the VRS 450 is accessed by the user 120 dialing a telephone number of the VRS 450 which is provided by a provider of the analog snapshot service. The telephone number of the VRS 450 may preferably be advertised and displayed on the television display 110 when the analog snapshot service is made available.

The VRS 450 preferably responds to a telephone call initiated by the user 120 by presenting the analog snapshot service. The user 120 may also be requested to enter user input information including, for example, one or more of the following: a telephone number of the mobile telephone 130; a source of a video signal received at the television display 110; a type of the mobile telephone 130; an indication indicating a mobile operator that provides cellular services for the mobile telephone 130; and a target mobile telephone number. It is appreciated that at least some of the user input information may be optional, such as, for example, the type of the mobile telephone 130 if the type can be autodetected.

It is appreciated that much of the user input information mentioned above may be provided once in a pre-registration as mentioned above, and stored at the VRS 450 for future sessions of snapshot transmission.

After accepting and processing the user input information, the VRS 450 may notify the user 120 that it is ready to accept a selection of a desired image from the streamed analog program which is rendered on the television display 110. The VRS 450 then preferably invites the user 120 to press a key on a keypad of the mobile telephone 130 when the user 120 notes a desired image on the television display 110.

Preferably, when the VRS 450 detects that the user 120 has pressed the key on the keypad of the mobile telephone 130, the VRS 450 generates a request with an indication signal comprising the selection time. Based on the selection time, it is possible to locate a video frame comprising the image as mentioned above.

It is appreciated that rights of information owners may be treated in similar ways in the system 200 of FIG. 6 and the system 400 of FIG. 7. Broadcasters that are also owners of content information that is subject to transmission as snapshots may charge users for taking snapshots of their own content. For broadcast material whose rights are not owned by the broadcasters, agreements may, for example, be made in which either the rights for offering the material are acquired by the broadcasters, or revenues from snapshot transmissions are split between owners of the rights and the broadcasters. Each program offered in a snapshot service may preferably include a code identifying a rights owner that may be entitled to at least a portion of payments made by users obtaining snapshots from the program.

It is appreciated that if a program is not offered in the snapshot service, the program may be assigned a metadata code that prevents taking and transmitting snapshots thus "turning off" the snapshot service for the program. Such "censoring" of the snapshot service is typically done by the scheduling system 290 of FIG. 6 and the scheduling system 470 of FIG. 7, respectively.

The metadata code may also be useful in billing users for snapshot transmissions because the metadata code identifies a streamed program from which the snapshots are taken. Identification of the program through the metadata code enables the snapshot service to credit a rights owner as mentioned above. Preferably, metadata associated with programs also includes different snapshot pricing indications, for example through metadata tags. The different snapshot pricing indications may preferably be presented to the users before they submit requests for snapshot transmissions.

It is appreciated that two matters are preferably addressed in order to achieve negligible inaccuracies in identification of correct snapshot sections in the system 400 of FIG. 7 opearting with any of a streamed analog program and a streamed digital program. The first matter addressed is synchronization among clocks of all sub-systems that are involved in a determination of a selection time of a section. The second matter addressed is possible latencies in the sub-systems. Preferably, in order to take the two matters into account, identification of the section includes performance of computations correcting at least one of the following: synchronization inaccuracies in at least one clock of at least one sub-system that is involved in computation of the selection time; and effect of latencies in the at least one sub-system.

The synchronization among the clocks of the sub-systems may be obtained by employing a computation mechanism, such as a clock synchronization software mechanism, for synchronizing the sub-systems clocks. An example of such a mechanism is the Network Time Protocol (NTP) software which is described at the World Wide Web site www.ntp.org, the disclosure of which is hereby incorporated herein by reference.

In order to take latencies into account, at least some of the latencies in the sub-systems may be determined in advance. It is appreciated that at least some of the latencies are believed to be fairly constant over time, and constant for most users. Any remaining variance in such latencies is believed to be small and without significant influence on end results.

The following sub-systems are expected to contribute latencies in the system 400: telephone connections and the VRS 450; broadcast sub-systems; and the iCapture element 440.

The latencies contributed by the telephone connections and the VRS 450 are expected to be insignificant because telephone systems and VRSs are designed a priori to successfully handle voice interaction and selections through key presses.

If the VRS 450 involves a network connection between hardware that handles telephone calls and a computer that is able to compute the selection time, the network connection may contribute network latency. If the network latency is fairly constant, the network latency may be measured and subtracted. Networks, however, have a tendency to have a high variance in latencies if and only if an amount of traffic passing in the networks is close to the maximal capacity. Thus, in order to avoid a high variance in latency, a network used for providing a snapshot service preferably has a traffic capacity larger than what is normally needed. If the network used for providing the snapshot service is to be shared, it is important to ensure exclusive reservation of ample capacity of the network for the snapshot service.

Another latency that may be associated with the VRS 450 is related to whether the VRS 450 records a key press when the key is pressed down or when the key is released. In such a case, it is preferred, in terms of latency, to use a VRS in which key presses are recorded when keys are pressed down.

Latencies of broadcast systems depend on how video signals are broadcast to users and to the iCapture element 440 which records the video signals. The video signals may, for example, be received at the iCapture element 440 at a different time than at the television display 110. If the iCapture element 440 receives the video signals from a source other than a source that broadcasts the video signals to the television display 110, it is possible to compute a resulting latency.

It is appreciated that a latency correction may, for example, be computed and entered if, for example, it is found from users' complaints that there is a consistent discrepancy between selected sections and sections actually being identified and transmitted. In such a case, computation of the latency correction may preferably include translating the discrepancy to a latency correction value.

If different sources, such as, for example, a cable source and a satellite transmission source, are used to provide video signals to different users, significant latencies in video reception may occur. In such a case, latencies of cable transmission and satellite transmission may be measured in advance and taken into account. It is appreciated that the user input information regarding a source of a video signal received at the television display 110 that is mentioned above is preferably used for taking such latencies into account.

Latency in the iCapture element 440 results from a difference between a time at which the streamed program is received and a computation time of the selection time. Such latency may be insignificant, or measured in advance and taken into account.

Figure 8:
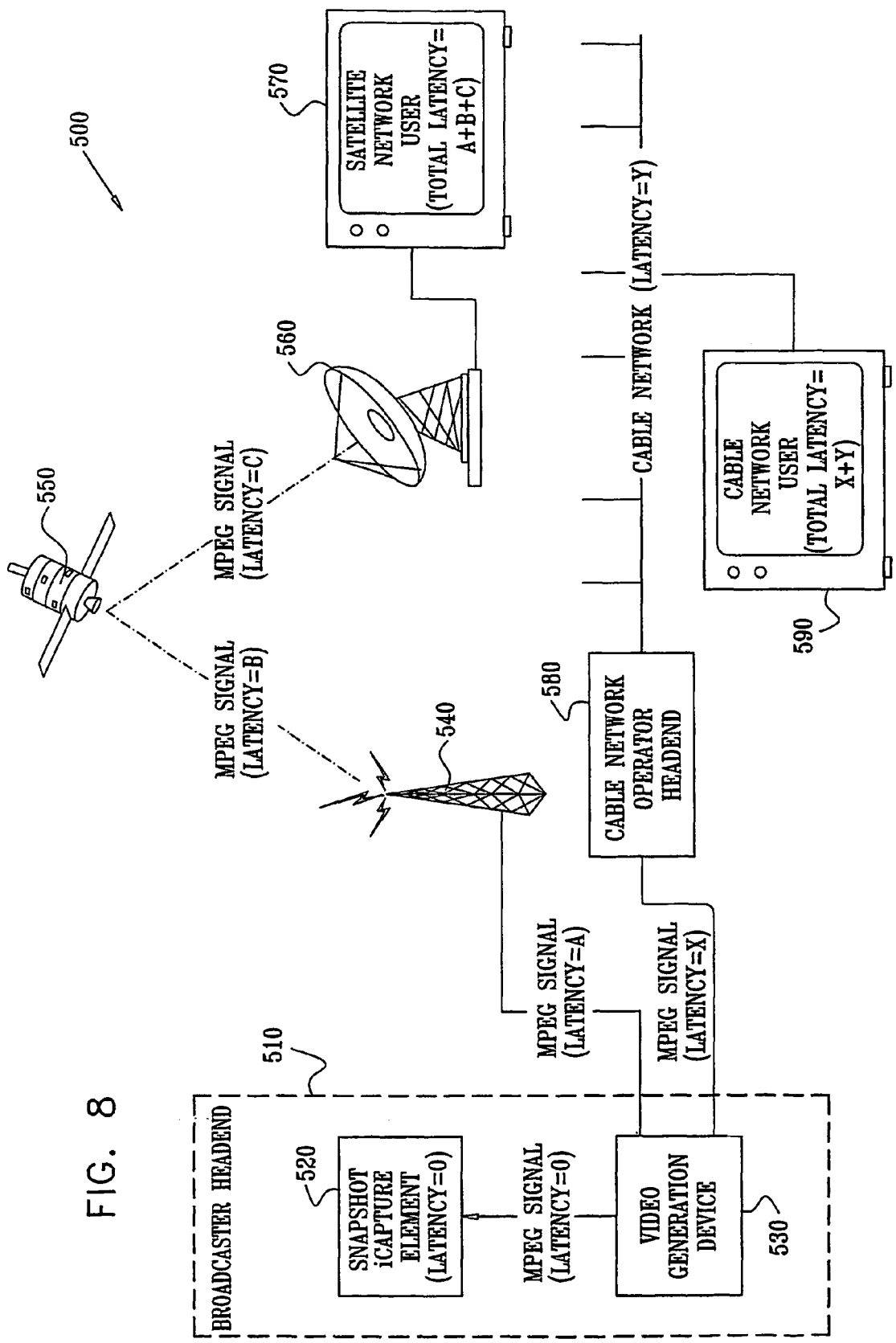
FIG. 8 is a simplified partly pictorial, partly block diagram illustration of a system for providing a snapshot service in which there are various latencies.

Reference is now made to FIG. 8, which is a simplified partly pictorial, partly block diagram illustration of a system 500 for providing a snapshot service in which there are various latencies. By way of example, the latencies refer to broadcast and reception of a streamed digital video signal in an MPEG format.

Preferably, a broadcaster headend 510 includes an iCapture element 520 and a video generation device 530 between which latency is, by way of example, zero. The video generation device 530 broadcasts, for example with broadcast latency A, an MPEG signal to an antenna 540. The antenna 540 transmits the MPEG signal to a communication satellite 550 with a latency B. A receiving antenna 560 receives the MPEG signal with a latency C, and thus a total latency at a user unit 570 is A+B+C.

It is appreciated that since a transmission coverage area of the satellite 550 is typically large, the latency C may differ depending on whether the antenna 540 is located at an edge of the transmission coverage area or at a center of the transmission coverage area. However, within a service area of, for example, a city or a county or a state, differences in latency C due to disparate locations of antennas are negligible. The transmission coverage area of the satellite 550 may therefore by divided into a plurality of such service areas, and the latency C for each such service area may be separately determined. The latency C by which the receiving antenna 560 receives the MPEG signal may be thus determined based on a service area within which the antenna 560 is located.

The video generation device 530 also broadcasts, for example with latency X, the MPEG signal to a cable network operator headend 580. The cable network operator headend 580 transmits the MPEG signal along a cable network that produces a latency Y. A total latency at a user unit 590 that is associated with the cable network is X+Y.

The latency Y may differ depending on a configuration of the cable network and distribution of user units in the cable network. However, within a service area of, for example, a local community or an urban quarter, differences in latency Y due to disparate locations of user units are negligible and the latency Y for each such service area may be separately determined. The total latency at the user unit 590 may be thus determined based on a service area within which the user unit 590 is located.

It is thus noted that although latencies in various transmission scenarios that may be used for providing a snapshot service may be different, it is possible to compute the latencies and to take them into account accordingly.

Figure 9:
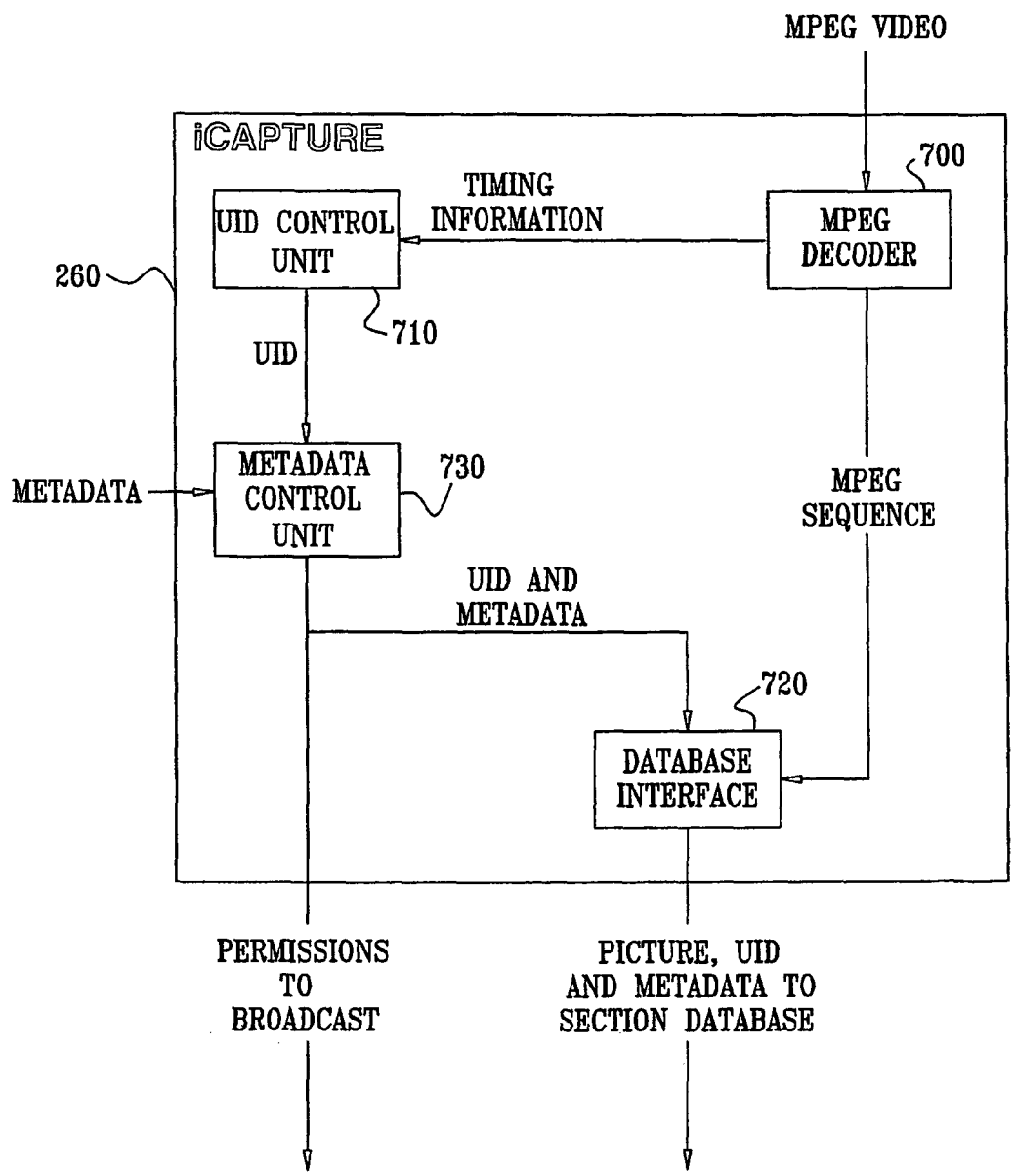
FIG. 9 is a simplified block diagram illustration of a preferred implementation of an iCapture element which is operative in either of the implementation depicted in FIG. 6 and the implementation depicted in FIG. 7 in a configuration that is suitable for processing a digital stream.

Reference is now made to FIG. 9, which is a simplified block diagram illustration of a preferred implementation of an iCapture element which is operative in either of the implementation depicted in FIG. 6 and the implementation depicted in FIG. 7 in a configuration that is suitable for processing a digital stream. By way of example, which is not meant to be limiting, the iCapture element depicted in FIG. 9 and described with reference to FIG. 9 comprises the iCapture element 260 of FIG. 6 in a configuration that is suitable for processing a digital stream.

The iCapture element 260 in the configuration that is suitable for processing a digital stream preferably prepares a streamed program within a digital stream in a format suitable for transmission of discrete sections. The streamed program may preferably include a digital program comprising at least one of the following: an audio program; a video program; an A/V program; and a multimedia program.

By way of example, which is not meant to be limiting, the streamed program inputted to the iCapture element 260 in the configuration that is suitable for processing a digital stream comprises MPEG encoded digital video and the sections comprise video frames.

It is appreciated that the MPEG video is preferably inputted to the iCapture element 260 in a clear form. If the MPEG video was originally encrypted, a decrypter (not shown), as is well known in the art preferably decrypts the encrypted MPEG video prior to providing it to the iCapture element 260 so that the iCapture element 260 ultimately receives decrypted streaming MPEG video.

Preferably, the iCapture element 260 in the configuration that is suitable for processing a digital stream includes the following elements: a decoder 700; a UID control unit 710; and a database interface 720. The iCapture element 260 may also include a metadata control unit 730.

The decoder 700 preferably comprises an MPEG decoder which decodes the streamed program into a plurality of video frames. The MPEG decoder 700 preferably produces one output with a time code embedded in the video frames and one with still pictures. The MPEG decoder 700 also preferably ensures that exactly one picture is generated for each frame. Further preferably, the MPEG decoder 700 checks the MPEG video to determine whether there are portions of the MPEG video for which a snapshot service should not be allowed. For example, the MPEG decoder 700 may decode the streamed program only if the streamed program is marked by a mark allowing transmission of discrete sections.

The MPEG decoder 700 also preferably divides the MPEG video into MPEG sequences for storage in a section database (not shown in FIG. 9). Preferably, the MPEG decoder 700 provides time codes to the UID control unit 710.

The UID control unit 710 preferably associates a UID with each frame in the plurality of video frames. Preferably, association of UIDs is performed in synchronization with UIDs in applications running on STBs. The UID control unit 710 preferably computes for each frame a time code of the frame and thus computes the UID. At the same time, the UID control unit 710 monitors time codes being broadcast to identify any discontinuities in the time codes. When a discontinuity occurs, a discontinuation counter is incremented.

The database interface 720 preferably enables storage in the section database and retrieval from the section database of each of the plurality of video frames through reference to a UID so that it is possible to perform lookups and searches based on UIDs.

The metadata control unit 730 is preferably operative to receive metadata from headend elements (not shown in FIG. 9), such as the data preparation unit 300 of FIG. 6, to process the metadata, and to dispatch the metadata, if necessary, to other elements (not shown). The metadata control unit 730 preferably has two responsibilities:

1. Responsibility for determining whether the snapshot service should be available or not. Based on such a determination, the metadata control unit 730 preferably sends data to the headend elements, for example to the data preparation unit 300 of FIG. 6. The data controls the availability of the snapshot service and it is ultimately transmitted to the STBs; and
2. Responsibility for constructing a reference between UIDs and billing information, that is creating a link between the UIDs and a specific rights owner.

It is appreciated that the metadata control unit 730 may receive, for example from the data preparation unit 300 of FIG. 6, metadata tags referring to a set of preferred sections representing the best frames of the plurality of video frames, and assign the metadata tags to the preferred sections upon storage in the section database. The set of preferred sections may, for example, be prepared by a headend operator (not shown).

If the iCapture element 260 receives a digital signal in a format other than MPEG as input, computation of UIDs cannot be made using time codes because time codes are specific to MPEG. In such a case, the MPEG decoder 700 is preferably replaced by another appropriate decoder that is capable of decoding the format other than MPEG and generating still pictures from such a format. The decoder that is capable of decoding the format other than MPEG also preferably provides timing information other than time codes to the UID control unit 710, where the timing information may be used as a basis for computing the UIDs.

Figure 10:
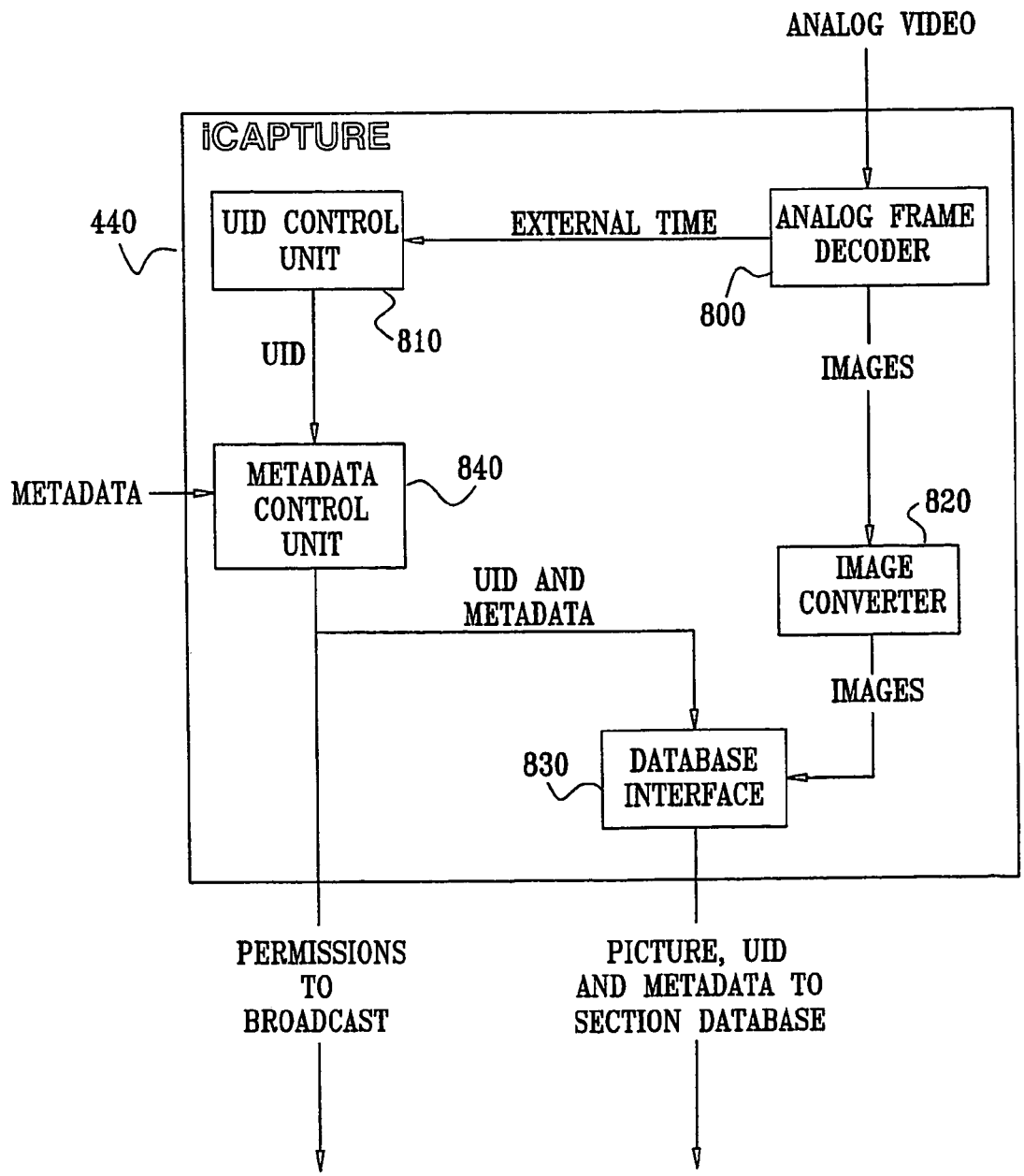
FIG. 10 is a simplified block diagram illustration of a preferred implementation of an iCapture element which is operative in either of the implementation depicted in FIG. 6 and the implementation depicted in FIG. 7 in a configuration that is suitable for processing an analog stream.

Reference is now made to FIG. 10, which is a simplified block diagram illustration of a preferred implementation of an iCapture element which is operative in either of the implementation depicted in FIG. 6 and the implementation depicted in FIG. 7 in a configuration that is suitable for processing an analog stream. By way of example, which is not meant to be limiting, the iCapture element depicted in FIG. 10 and described with reference to FIG. 10 comprises the iCapture element 440 of FIG. 7 in a configuration that is suitable for processing an analog stream.

The iCapture element 440 in the configuration that is suitable for processing an analog stream preferably prepares a streamed analog program within an analog stream in a format suitable for transmission of discrete sections. The streamed analog program preferably includes at least one of the following: an audio program; a video program; an A/V program; and a multimedia program.

By way of example, which is not meant to be limiting, the streamed analog program inputted to the iCapture element 440 in the configuration that is suitable for processing an analog stream comprises encoded analog video which is received, for example, from the headend streaming device 480 of FIG. 7, and the sections comprise video frames.

Preferably, the iCapture element 440 in the configuration that is suitable for processing an analog stream includes the following elements: an analog frame decoder 800; a UID control unit 810; an image converter 820; and a database interface 830. The iCapture element 440 may also include a metadata control unit 840. The database interface 830 preferably interfaces to a section database (not shown in FIG. 10).

The analog frame decoder 800 is preferably responsible for decoding inputted analog video into a plurality of video frames and for preparing the frames of the analog video for storage in the section database.

The image converter 820 preferably converts the video frames from a format outputted from the analog frame decoder 800 into, for example, a format best suitable for display on mobile telephones. For example, format conversion may be performed to change picture sizes to sizes acceptable on the mobile telephones.

The UID control unit 810 preferably determines UIDs based on, for example, either frame timing information provided by the analog frame decoder 800 or an input provided by an external clock. The LID control unit 810 also preferably associates, in synchronization, a UID with each video frame in the plurality of video frames.

The database interface 830 and the metadata control unit 840 may be similar to the database interface 720 of FIG. 9 and the metadata control unit 730 of FIG. 9, respectively.

It is appreciated that the iCapture element 260 of FIG. 9 and the iCapture element 440 of FIG. 10 may alternatively be comprised in a combined architecture (not shown) for dealing with both digital video and analog video.

Figure 11:
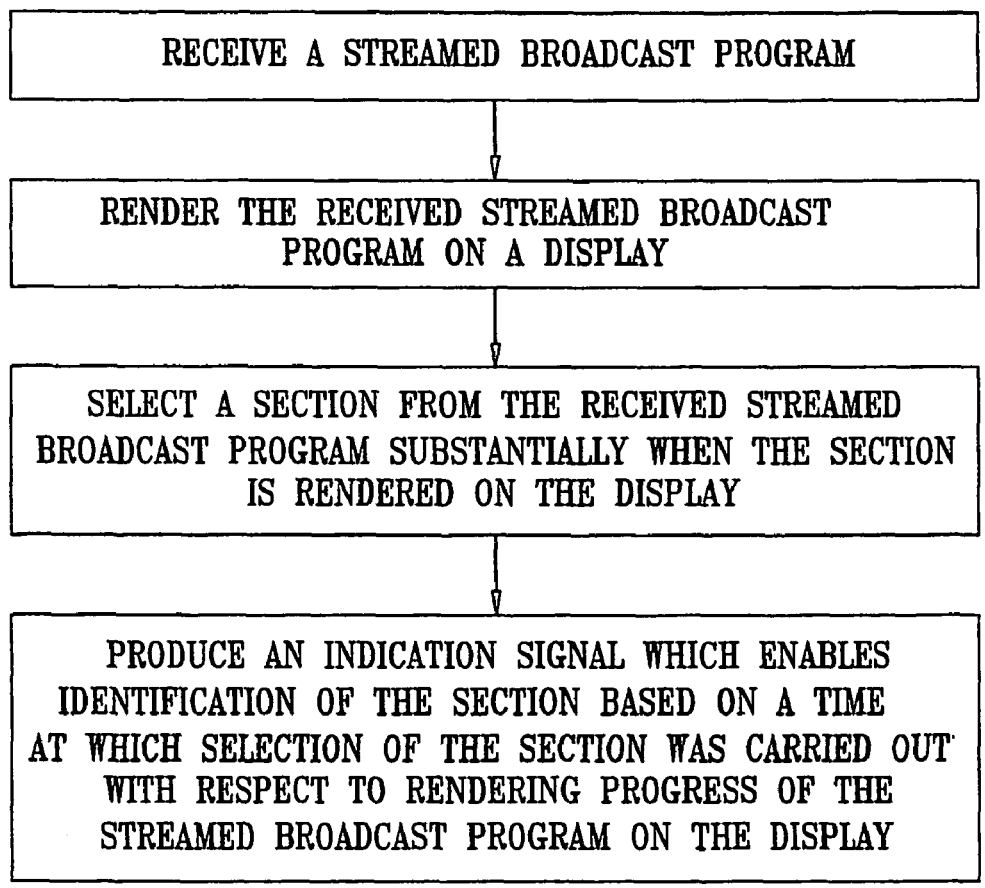
FIG. 11 is a simplified flowchart illustration of a preferred method of operation of any of the apparatus of FIGS. 1A-1D and the apparatus of FIGS. 2A and 2B.

Reference is now made to FIG. 11, which is a simplified flowchart illustration of a preferred method of operation of any of the apparatus 10 of FIGS. 1A-1D and the apparatus 100 of FIGS. 2A and 2B. The method of FIG. 11 is self-explanatory.

Reference is now made to FIG. 12, which is a simplified flowchart illustration of a preferred method of operation of any of the apparatus depicted in FIG. 6 and the apparatus depicted in FIG. 7. The method of FIG. 12 is self-explanatory.

Reference is now made to FIG. 13, which is a simplified flowchart illustration of a preferred method of operation of any of the iCapture element 260 of FIG. 9 and the iCapture element 440 of FIG. 10. The method of FIG. 13 preferably comprises the following steps:

A streamed program is decoded (step 1000) into a plurality of discrete sections in preparation for preparing the streamed program in a format suitable for transmission of discrete sections. A UID is associated (step 1010), in synchronization, with each discrete section in the plurality of discrete sections, and storage and retrieval of each of the plurality of discrete sections is enabled (step 1020) through reference to a UID.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the claims which follow:

What is claimed is:

1. A method for transmitting a video and/or audio sequence to a target device based on a selection of a streamed broadcast program, the streamed broadcast program being broadcast to a user for being rendered on a display, the selection being selected from the streamed broadcast program by the user pressing a key on a keypad of a user selection unit, the selection being made by the user at a selection time substantially when the selection is rendered on the display, the method comprising:

receiving an indication signal which enables identification of the selection based on the selection time at which the selection was selected;

computing the selection time when the user pressed the key on the keypad; then identifying the selection based on the computed selection time when the user pressed the key on the keypad with respect to rendering progress of the streamed broadcast program on the display, wherein the identifying includes identifying the selection based on the indication signal; and then transmitting the video and/or audio sequence based on the selection of the streamed broadcast program to at least one of an external device and an external medium;

wherein the receiving, the identifying and the transmitting are performed at a Headend.

2. The method according to claim 1 and wherein said identifying comprises:

the computing, based on the indication signal, of the selection time representing the time at which the selection was selected within a rendering period of the streamed broadcast program on the display; and recognizing the selection as a discrete section which, in a sequential series of discrete sections constructed from the streamed broadcast program, corresponds to the selection time.

3. The method according to claim 2 and wherein each of the sections in the sequential series of discrete sections is tagged with a unique identification (UID), and the recognizing comprises determining a UID of the discrete section.

4. The method according to claim 1 and also comprising:

finding, in response to the identifying, a replacement section that relates to the selection; and transmitting a video and/or audio sequence of the replacement section to at least one of the following: the external device; and the external medium.

5. The method according to claim 1 and wherein the external device comprises at least one of the following: a mobile telephone; a computing device; an entertainment device; a printer; and a communication device.

6. The method according to claim 1 and wherein the external medium comprises at least one of the following: a medium in the external device; and a medium attached to the external device.

7. The method according to claim 1 and wherein the external medium comprises a memory stick.

8. The method according to claim 1 and also comprising receiving the video and/or audio sequence embedded in at least one of the following: a Multimedia Messaging Service (MMS) message; a Wireless Application Protocol (WAP) push message; a JAVA™ application; and an electronic-mail (e-mail) message.

9. The method according to claim 1 and wherein the video and/or audio sequence is suitable for at least one of the following: playing on the external device; displaying on the external device; editing via the external device; and transmitting to another external device.

10. The method according to claim 1 and also comprising: editing the video and/or audio sequence.

11. The method according to claim 10 and wherein the editing comprises at least one of the following: cropping a displayed area of the video and/or audio sequence; reducing a displayed area of the video and/or audio sequence; and enlarging a displayed area of the video and/or audio sequence.

12. The method according to claim 10 and also comprising returning editing values of selection parameters in response to the editing.

13. The method according to claim 12 and wherein the returning comprises returning the editing values to a server.

14. The method according to claim 13 and wherein the server is associated with the headend.

15. The method according to claim 13 and wherein the server is comprised in the headend.

16. The method according to claim 12 and wherein the editing values comprise at least one of the following: picture display coordinates; picture size information; information regarding picture elements positions; and audio parameters.

17. The method according to claim 12 and also comprising:

processing the video and/or audio sequence and the editing values to produce a result comprising at least one of the following: an edited video and/or audio sequence; and a new video and/or audio sequence; and transmitting the result, in response to the processing, to at least one of the external device and the external medium.

18. The method according to claim 1 and also comprising: receiving a request to receive at least one of the following: another video and/or audio sequence preceding the selection in the streamed broadcast program; and another video and/or audio sequence following the selection in the streamed broadcast program.

19. The method according to claim 1 and wherein the streamed broadcast program comprises at least one of the following: a streamed audio program; a streamed video program; a streamed A/V program; and a streamed multimedia program.

20. The method according to claim 1 and wherein the streamed broadcast program comprises at least one of the following: a television program; an audio program; a video clip; an interactive television program; a multimedia program; and a multimedia presentation.

21. The method according to claim 1 and wherein the identifying comprises identifying the selection within an identification error range.

22. The method according to claim 1 and wherein:
the streamed broadcast program comprises an analog program;
the selecting comprises pressing a key on a telephone keypad; and
the computing comprises computing the selection time at a voice response system.

23. The method according to claim 22 and wherein the analog program comprises at least one of the following: an audio program; a video program; an A/V program; and a multimedia program.

24. The method according to claim 2 and wherein:
the streamed broadcast program comprises a digital program;
the user selection unit is a remote control having the key;
the selecting comprises pressing the key on the remote control; and
the computing comprises computing the selection time at a Headend.

25. The method according to claim 24 and wherein the digital program comprises at least one of the following: an audio program; a video program; an A/V program; and a multimedia program.

26. The method according to claim 1 and wherein the indication signal is received from an STB.

27. The method according to claim 1 and wherein the transmitting of the video and/or audio sequence comprises:
producing an indication of agreement by a user to pay for the transmitting of the video and/or audio sequence; and
transmitting the video and/or audio sequence in response to the producing.

28. The method according to claim 10 and wherein the editing comprises editing the video and/or audio sequence via one of the following: the external device; and an STB.

29. The method according to claim 1 and also comprising, prior to the selecting, inviting a user to select a desired selection.

30. The method according to claim 29 and wherein the inviting comprises displaying a message inviting the user to select the desired selection.

31. The method according to claim 29 and wherein the inviting comprises playing a message inviting the user to select the desired selection.

32. The method according to claim 1 and also comprising, prior to the selecting, accepting user input information comprising at least one of the following: a user's mobile telephone number; a source of a video signal received at one of the display and a user's STB; a user's mobile telephone type; an indication indicating a mobile operator that provides cellular services for the user's mobile telephone; and a target mobile telephone number.

33. The method according to claim 1 and wherein the selection comprises a plurality of sub-sections, and the selecting comprises selecting a start sub-section and a stop sub-section from the plurality of sub-sections.

34. The method according to claim 33 and also comprising determining a timeout stop sub-section if the stop sub-section is not selected within a timeout period.

35. The method according to claim 33 and wherein the selecting comprises selecting the start sub-section by pressing on a first key of an input device, and selecting the stop sub-section by pressing on a second key of the input device.

36. The method according to claim 33 and wherein the selecting comprises selecting the start sub-section by pressing once on a key of an input device, and selecting the stop sub-section by pressing again on the key of the input device.

37. The method according to claim 1 and wherein the transmitting of the video and/or audio sequence comprises associating branding information identifying a provider of the streamed broadcast program with the video and/or audio sequence.

38. The method according to claim 37 and wherein the branding information comprises an owner rights code.

39. The method according to claim 3 and wherein the UID comprises an identifier based on a combination of values obtained from at least one of the following: a time code; a frame counter; and a discontinuation counter.

40. The method according to claim 3 and wherein the UID comprises an identifier derived from a received broadcast transmission.

41. The method according to claim 3 and wherein the UID comprises an identifier derived from time information provided by an external clock.

42. The method according to claim 2 and wherein the computing also comprises performing computations correcting at least one of the following: synchronization inaccuracies in at least one clock of at least one sub-system that is involved in computation of the selection time; and effect of latencies in the at least one sub-system.

43. The method according to claim 2 and wherein the recognizing comprises:
finding a first preferred section and a second preferred section from a set of preferred sections representing the best sections of the sequential series of discrete sections, the first preferred section being the nearest preferred section before the discrete section that corresponds to the selection time, and the second preferred section being the nearest preferred section after the discrete section that corresponds to the selection time; and
selecting the selection as one of the first and the second preferred sections which is closer in the sequential series of discrete sections to the discrete section that corresponds to the selection time.

44. The method according to claim 43 and wherein the set of preferred sections comprises predefined preferred sections.

45. The method according to claim 43 and wherein the selecting of the selection as one of the first and the second preferred sections comprises selecting the selection as one of the first and the second preferred sections in response to a determination of the streamed broadcast program as a preview.

46. The method according to claim 43 and also comprising enabling linked access to external information via the selection.

47. A system for transmitting a video and/or audio sequence to a target device based on a selection of a streamed broadcast program, the streamed broadcast program being broadcast to a user for being rendered on a display, the selection being selected from the streamed broadcast program by the user pressing a key on a keypad of a user selection unit, the selection being made by the user at a selection time substantially when the selection is rendered on the display, the system comprising:
- a receiver for receiving an indication signal which enables identification of the selection based on the selection time at which the selection was selected, wherein the identifying includes identifying the selection based on the indication signal;
- an identifier unit to: compute the selection time when the user pressed the key on the keypad; and then identify the selection based on the computed selection time when the user pressed the key on the keypad with respect to rendering progress of the streamed broadcast program on the display; and
- a transmitting unit to transmit the video and/or audio sequence based on the selection of the streamed broadcast program to at least one of an external device and an external medium;
wherein the receiver, the identifier unit and the transmitting unit are comprised in a Headend.

48. A system for transmitting a video and/or audio sequence to a target device based on a selection of a streamed broadcast program, the streamed broadcast program being broadcast to a user for being rendered on a display, the selection being selected from the streamed broadcast program by the user pressing a key on a keypad of a user selection unit, the selection being made by the user at a selection time substantially when the selection is rendered on the display, the system comprising:
- means for receiving an indication signal which enables identification of the selection based on the selection time at which the selection was selected, wherein the identifying includes identifying the selection based on the indication signal;
- means for computing the selection time when the user pressed the key on the keypad;
- means for identifying the selection based on the computed selection time when the user pressed the key on the keypad with respect to rendering progress of the streamed broadcast program on the display; and
- means for transmitting the video and/or audio sequence based on the selection of the streamed broadcast program to at least one of an external device and an external medium,
wherein the means for receiving, the means for identifying and the means for transmitting are comprised in a Headend.

49. A Headend System to perform the steps of the method of claim 1.

* * * * *